US012771483B2

(12) United States Patent
Elshafie et al.

(10) Patent No.: US 12,771,483 B2
(45) Date of Patent: Oct. 20, 2026

(54) FLEXIBLE SELECTION OF A HYBRID AUTOMATIC REPEAT REQUEST (HARQ) PROCESS IDENTIFIER FROM A HARQ PROCESS IDENTIFIER POOL

(71) Applicant: QUALCOMM Incorporated, San Diego, CA (US)

(72) Inventors: Ahmed Elshafie, San Diego, CA (US); Huilin Xu, Temecula, CA (US); Diana Maamari, San Diego, CA (US); Yan Zhou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 614 days.

(21) Appl. No.: 18/324,713

(22) Filed: May 26, 2023

(65) Prior Publication Data

US 2024/0396670 A1 Nov. 28, 2024

(51) Int. Cl.
*H04L 1/1812* (2023.01)
*H04L 1/1829* (2023.01)
*H04W 72/21* (2023.01)

(52) U.S. Cl.
CPC .......... *H04L 1/1812* (2013.01); *H04L 1/1861* (2013.01); *H04W 72/21* (2023.01)

(58) Field of Classification Search
CPC ... H04L 5/0053; H04L 5/0055; H04L 5/0057; H04W 72/02; H04W 72/04; H04W 72/0446; H04W 72/21; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

2020/0413289 A1* 12/2020 Akkarakaran ........ H04L 1/1822
2021/0385838 A1* 12/2021 Khoshnevisan ...... H04L 5/0087
2023/0171038 A1* 6/2023 Yang .................... H04L 5/0055 370/329
2024/0406956 A1* 12/2024 Tsai ...................... H04L 1/1812
(Continued)

OTHER PUBLICATIONS

International Search Report and Written Opinion—PCT/US2024/022878—ISA/EPO—Jul. 1, 2024.
(Continued)

*Primary Examiner* — Bo Hui A Zhu
(74) *Attorney, Agent, or Firm* — HARRITY & HARRITY, LLP

(57) ABSTRACT

Various aspects of the present disclosure generally relate to wireless communication. A user equipment (UE) may be provided with one or more hybrid automatic repeat request (HARQ) process identifier pools that each include one or more HARQ process identifiers. The HARQ process identifier pools may be associated with one or more delay parameters and may be configured to support different delay parameters. Similarly, the HARQ process identifiers included in a HARQ process identifier pool may be configured to support different delay parameters. The UE may prioritize HARQ process identifiers from the one or more HARQ process identifier pools for uplink communications to support delay parameters for the uplink communication.

18 Claims, 9 Drawing Sheets

(56) References Cited

U.S. PATENT DOCUMENTS

2025/0203631 A1* 6/2025 Lei ........................ H04L 5/0055

OTHER PUBLICATIONS

Sony: "Retransmission-less CG for Some XR Traffic", 3GPP TSG-RAN WG2 Meeting #121bis-e, R2-2303084, 3rd Generation Partnership Project (3GPP), Mobile Competence Centre, 650, Route Des Lucioles, F-06921 Sophia-Antipolis Cedex, France, vol. RAN WG2, No. Online; Apr. 17, 2023-Apr. 26, 2023, Apr. 6, 2023, 3 Pages, XP052365351, p. 2-p. 3.

* cited by examiner

FLEXIBLE SELECTION OF A HYBRID AUTOMATIC REPEAT REQUEST (HARQ) PROCESS IDENTIFIER FROM A HARQ PROCESS IDENTIFIER POOL

FIELD OF THE DISCLOSURE

Aspects of the present disclosure generally relate to wireless communication and specifically, to techniques and apparatuses for flexible selection of a hybrid automatic repeat request (HARQ) process identifier from a HARQ process identifier pool.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Uplink traffic may consist of multiple uplink flows that may have different periodicities (for example, different arrival rates) and/or different packet delay budgets. For example, a UE may have some uplink traffic flows that have a short periodicity (such as packets arriving every 4 milliseconds) relative to other uplink traffic flows (such as packets that arriving every 40 milliseconds). Moreover, some uplink traffic flows may have more stringent delay requirements relative to other uplink traffic flows. Typically, when a network node schedules uplink communications for the UE, the network node may provide the UE with a hybrid automatic repeat request (HARQ) process identifier in (for example, in a scheduling dynamic control information (DCI)) for an associated HARQ process that the UE is to use for an uplink transmission associated with one or more uplink traffic flows. However, the network node may be unaware of the experienced delay for the uplink communication, such as the time that the uplink communication has been waiting for scheduling of uplink resources for transmitting the uplink communication. As a result, the network node may schedule a HARQ process that is less delay sensitive than another HARQ process. For example, for an uplink communication that has a stringent delay parameter (such as an uplink communication for providing head pose information for an extended reality (XR) uplink traffic flow), the network node might assign a HARQ process identifier associated with a HARQ process for which retransmissions are enabled even though the UE is not expected to accommodate retransmissions of the uplink communication because of the stringent delay parameter. Using the HARQ process identifier associated with the HARQ process for which retransmissions are enabled may result in the UE unnecessarily consuming processing resources and/or battery resources, in that the UE may consume processing resources and/or battery resources by starting and tracking a retransmission timer for the HARQ process even through the UE is not expected to accommodate retransmissions of the uplink communication.

SUMMARY

Some aspects described herein relate to a method of wireless communication performed at a user equipment (UE). The method may include selecting, in association with a delay parameter for an uplink communication, a hybrid automatic repeat request (HARQ) process identifier from a plurality of HARQ process identifiers included in a HARQ process identifier pool, the HARQ process identifier being associated with the uplink communication. The method may include transmitting an indication of the HARQ process identifier. The method may include transmitting the uplink communication.

Some aspects described herein relate to a method of wireless communication performed at a network node. The method may include transmitting an indication of a HARQ process identifier pool associated with a UE. The method may include receiving an indication of a HARQ process identifier among a plurality of HARQ process identifiers included in the HARQ process identifier pool. The method may include receiving an uplink communication associated with the HARQ process identifier.

Some aspects described herein relate to an apparatus for wireless communication at a UE. The apparatus may include one or more memories storing processor-readable code and one or more processors coupled with the one or more memories. At least one processor of the one or more processors may be operable to select, in association with a delay parameter for an uplink communication, a HARQ process identifier from a plurality of HARQ process identifiers included in a HARQ process identifier pool, the HARQ process identifier being associated with the uplink communication. At least one processor of the one or more processors may be operable to transmit an indication of the HARQ process identifier. At least one processor of the one or more processors may be operable to transmit the uplink communication.

Some aspects described herein relate to an apparatus for wireless communication at a network node. The apparatus may include one or more memories storing processor-readable code and one or more processors coupled with the one or more memories. At least one processor of the one or more processors may be operable to transmit an indication of a HARQ process identifier pool associated with a UE. At least one processor of the one or more processors may be operable to receive an indication of a HARQ process identifier among a plurality of HARQ process identifiers included in the HARQ process identifier pool. At least one processor of the one or more processors may be operable to receive an uplink communication associated with the HARQ process identifier.

Some aspects described herein relate to a non-transitory computer-readable medium storing a set of instructions for wireless communication. The set of instructions may include one or more instructions that, when executed at a UE, cause the UE to select, in association with a delay parameter for an uplink communication, a HARQ process identifier from a plurality of HARQ process identifiers included in a HARQ process identifier pool, the HARQ process identifier being associated with the uplink communication. The set of instructions may include one or more instructions that, when executed at the UE, cause the UE to transmit an indication of the HARQ process identifier. The set of instructions may include one or more instructions that, when executed at the UE, cause the UE to transmit the uplink communication.

Some aspects described herein relate to a non-transitory computer-readable medium storing a set of instructions for wireless communication. The set of instructions may include one or more instructions that, when executed at a network node, cause the network node to transmit an indication of a HARQ process identifier pool associated with a UE. The set of instructions may include one or more instructions that, when executed at a network node, cause the network node to receive an indication of a HARQ process identifier among a plurality of HARQ process identifiers included in the HARQ process identifier pool. The set of instructions may include one or more instructions that, when executed at a network node, cause the network node to receive an uplink communication associated with the HARQ process identifier.

Some aspects described herein relate to an apparatus for wireless communication. The apparatus may include means for selecting, in association with a delay parameter for an uplink communication, a HARQ process identifier from a plurality of HARQ process identifiers included in a HARQ process identifier pool, the HARQ process identifier being associated with the uplink communication. The apparatus may include means for transmitting an indication of the HARQ process identifier. The apparatus may include means for transmitting the uplink communication.

Some aspects described herein relate to an apparatus for wireless communication. The apparatus may include means for transmitting an indication of a HARQ process identifier pool associated with a UE. The apparatus may include means for receiving an indication of a HARQ process identifier among a plurality of HARQ process identifiers included in the HARQ process identifier pool. The apparatus may include means for receiving an uplink communication associated with the HARQ process identifier.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
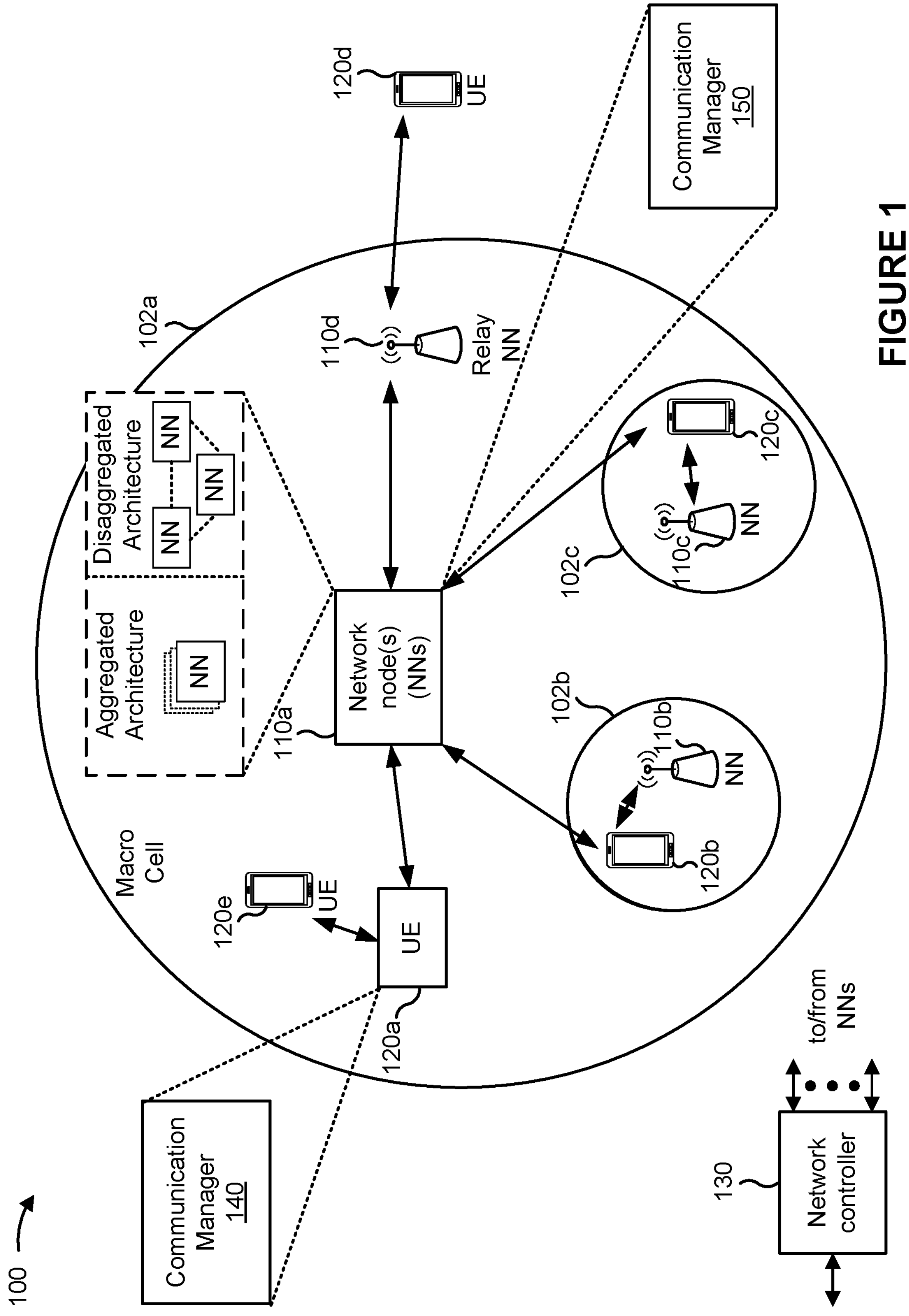
FIG. 1 is a diagram illustrating an example of a wireless network.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Uplink traffic may consist of multiple uplink flows that may have different periodicities (for example, different arrival rates) and/or different packet delay budgets. For example, a user equipment (UE) may have some uplink traffic flows that have a short periodicity (such as packets arriving every 4 milliseconds) relative to other uplink traffic flows (such as packets that arriving every 40 milliseconds). Moreover, some uplink traffic flows may have more stringent delay requirements relative to other uplink traffic flows. Typically, when a network node schedules uplink communications for the UE, the network node may provide the UE with a hybrid automatic repeat request (HARQ) process identifier in (for example, in a scheduling dynamic control information (DCI)) for an associated HARQ process that the UE is to use for an uplink transmission associated with one or more uplink traffic flows.

However, the network node may be unaware of the experienced delay for the uplink communication, such as the time that the uplink communication has been waiting for scheduling of uplink resources for transmitting the uplink communication. The UE may be unable to coordinate with and/or provide input to the network node for assigning and/or selecting HARQ process identifiers. As a result, the network node may schedule a HARQ process that is less delay sensitive than another HARQ process. For example, for an uplink communication that has a stringent delay parameter (such as an uplink communication for providing head pose information for an extended reality (XR) uplink traffic flow), the network node might assign a HARQ process identifier associated with a HARQ process for which retransmissions are enabled even though the UE is not expected to accommodate retransmissions of the uplink communication because of the stringent delay parameter. Using the HARQ process identifier associated with the HARQ process for which retransmissions are enabled may result in the UE unnecessarily consuming processing resources and/or battery resources, in that the UE may consume processing resources and/or battery resources by starting and tracking a retransmission timer for the HARQ process even through the UE is not expected to accommodate retransmissions of the uplink communication.

In some cases, such as for configured grant (CG) retransmissions (ReTx), the UE may indicate (e.g., in CG uplink control information (UCI) a CG HARQ process identifier for the CG ReTx. However, the UE may be unable to select HARQ process identifiers for dynamic grant (DG) uplink communication. It may also be undesirable to give the UE full control over selection of HARQ process identifiers because the network node may have knowledge of the packet delay budget (PDB) for an uplink communication, even if the network node does not have knowledge of the remaining available PDB for the uplink communication.

Various aspects described herein relate generally to HARQ process identifier selection. Some aspects more specifically relate to flexible selection of a HARQ process identifier from a HARQ process identifier pool. In some aspects, a UE may be provided/configured with one or more HARQ process identifier pools that each may include one or more HARQ process identifiers. The HARQ process identifier pools and the associated one or more HARQ process identifiers may enable the UE to select a HARQ process identifier for an uplink communication for CG resource allocation as well as DG resource allocation. A network node may provide input the UE to restrict the selection of the HARQ process identifier to certain HARQ process identifiers and/or to certain HARQ process identifier pools so that some control over the selection of the HARQ process identifier is retained by the network node. This enables the network node's knowledge of PDB for the uplink communication, as well as the UE's knowledge of the remaining PDB for the uplink communication, to be considered for the selection of the HARQ process identifier. In particular, since the knowledge of the PDB for the uplink communication is not enough for optimized HARQ process identifier selection, the UE may use the delay information (e.g., the knowledge of the remaining PDB) to downselect the HARQ process identifier from the input received from the network node, even if there is no HARQ feedback (acknowledgement/negative acknowledgement) from the network node.

The HARQ process identifier pools may be associated with one or more delay parameters and may be configured to support different delay parameters. A UE may be provided a rule on association of logical channels to HARQ process pools based on the delay parameters. Similarly, the HARQ process identifiers included in a HARQ process identifier pool may be configured to support different delay parameters. The UE may prioritize HARQ process identifiers from the one or more HARQ process identifier pools for uplink communications to support delay parameters for the uplink communication. The UE and a network node may cooperate to configure parameters for configuring the HARQ process identifier pools and/or for the HARQ process identifiers that are included in a HARQ process identifier pool based on and/or otherwise in association with various parameters, such as transport block priority, remaining PDB, and/or an energy profile of the UE, among other examples.

Particular aspects of the subject matter described in this disclosure can be implemented to realize one or more of the following potential advantages. In some examples, providing a UE with a HARQ process identifier pool may enable the UE to select a HARQ process identifier from the HARQ process identifier pool, which may enable the UE to optimally select or prioritize the HARQ process identifier for an uplink communication in association with a delay parameter (such as an experienced delay for the uplink communication). Enabling the UE to select or prioritize HARQ process identifiers for uplink communications (as opposed to a network node selecting the HARQ process identifiers) enables the UE to account for delay parameters at the UE that the network node may not be aware of, which may enable the UE to satisfy those delay parameters.

Enabling the UE to select or prioritize a HARQ process identifier for an uplink communication may enable the UE to select a HARQ process identifier for which retransmissions are not enabled if the delay parameter for the uplink transmission is a stringent (such as the uplink transmission requiring low latency), which may reduce power consumption and may conserve battery resources of the UE, in that the UE does not need to monitor for HARQ feedback and/or does not need to start and monitor a retransmission timer for the uplink communication. Moreover, enabling the UE to select or prioritize a HARQ process identifier for an uplink communication may enable the UE to flush a transmission buffer (a packet buffer in which packets awaiting transmission may be stored) of the UE 120 of associated packets for PDBs that cannot be satisfied, which reduces the power consumption of the UE (particularly for energy harvesting type UEs) for maintaining the transmission buffer. This also enables the UE to select from the remaining (surviving) HARQ process identifiers and associated packets, which reduces the complexity of selecting a HARQ process identifier. The UE may start with flushing the lowest priority packets from the transmission buffer, and may continue with higher priority packets that are likely to expire (or will expire) before the next uplink grant (dynamic or configured) is received.

Enabling the UE to select or prioritize HARQ process identifiers for the uplink communications may enable the UE to select or prioritize HARQ process identifiers for uplink communications that are configured or scheduled by CG (such as by radio resource control (RRC) configuration) as well as DG (such as by DCI scheduling).

In some examples, a UE and a network node cooperate to configure parameters for configuring the HARQ process identifier pools and/or the HARQ process identifiers that are included in a HARQ process identifier pool enables delay parameters that the UE is aware of, as well as delay parameters that the network node is aware of, to be accounted for in configuration of the HARQ process identifier pools and/or the HARQ process identifiers. The cooperation in configuring parameters for configuring the HARQ process identifier pools and/or the HARQ process identifiers that are included in a HARQ process identifier pool may enable the network node to configure optimal HARQ process identifier pools and/or optimal sets of HARQ process identifiers in each HARQ process identifier pool, which may provide comprehensive coverage for various delay parameter scenarios experienced by the UE.

FIG. 1 is a diagram illustrating an example of a wireless network. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses (for example, an augmented reality (AR), virtual reality (VR), mixed reality, or extended reality (XR) headset), a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium. Some UEs 120 (for example, UEs 102*a* and 120*e*) may communicate directly using one or more sidelink channels (for example, without a network node as an intermediary to communicate with one another).

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, one or more memories) may be operatively coupled, communicatively coupled, electronically coupled, or electrically coupled.

In some examples, two or more UEs 120 (for example, shown as UE 120*a* and UE 120*c*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol using for example a PC5 interface for direct communication, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110. In other examples, the two or more UEs 120 may communicate through a vehicle-to-network-vehicle (V2N2V) protocol for example by communicating through a Uu interface using the LTE and/or NR uplink and downlink.

In some aspects, a UE 120 may include a communication manager 140. As described in more detail elsewhere herein, the communication manager 140 may select, in association with a delay parameter for an uplink communication, a HARQ process identifier from a plurality of HARQ process identifiers included in a HARQ process identifier pool, the HARQ process identifier being associated with the uplink communication; may transmit an indication of the HARQ process identifier; and/or may transmit the uplink communication. Additionally or alternatively, the communication manager 140 may perform one or more other operations described herein.

In some aspects, a network node 110 may include a communication manager 150. As described in more detail elsewhere herein, the communication manager 150 may transmit an indication of a HARQ process identifier pool associated with a UE; may receive an indication of a HARQ process identifier among a plurality of HARQ process identifiers included in the HARQ process identifier pool; and/or may receive an uplink communication associated with the HARQ process identifier. Additionally or alternatively, the communication manager 150 may perform one or more other operations described herein.

Figure 2:
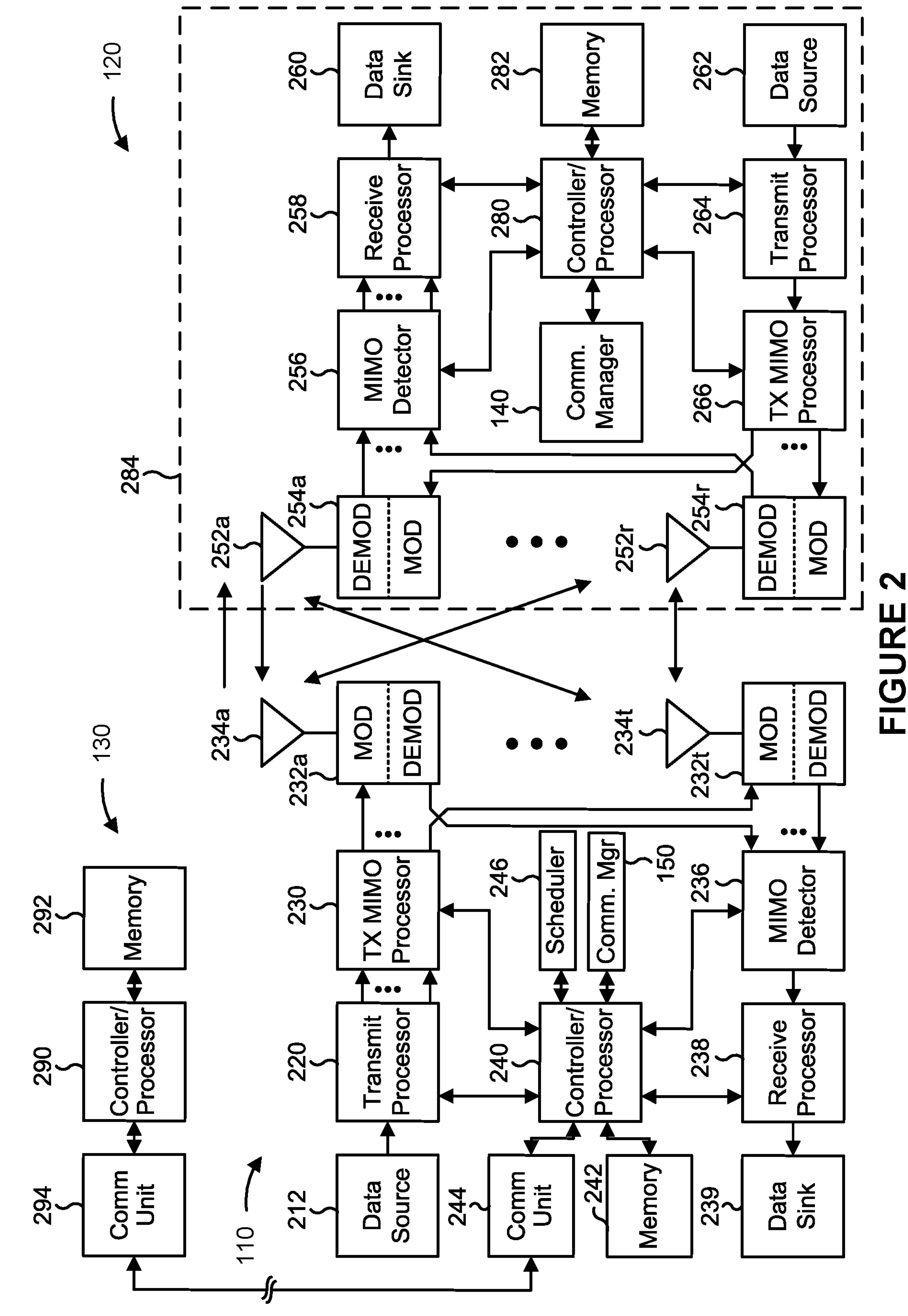
FIG. 2 is a diagram illustrating an example network node in communication with a user equipment (UE) in a wireless network.

FIG. 2 is a diagram illustrating an example network node in communication with a UE in a wireless network. The network node may correspond to the network node 110 of FIG. 1. Similarly, the UE may correspond to the UE 120 of FIG. 1. The network node 110 may be equipped with a set of antennas 234*a* through 234*t*, such as T antennas ($T \geq 1$). The UE 120 may be equipped with a set of antennas 252*a* through 252*r*, such as R antennas ($R \geq 1$). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with flexible selection of a HARQ process identifier from a HARQ process identifier pool, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 220, TX MIMO processor 230, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280. As used herein, "processor," "controller," or "controller/processor" can refer to a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof. A general purpose processor may be a microprocessor or any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

In some aspects, UE 120 may include means for selecting, in association with a delay parameter for an uplink communication, a HARQ process identifier from a plurality of HARQ process identifiers included in a HARQ process identifier pool, the HARQ process identifier being associated with the uplink communication, means for transmitting an indication of the HARQ process identifier, and/or means for transmitting the uplink communication, among other examples. In some aspects, such means may include one or more components of UE 120 described in connection with FIG. 2, such as controller/processor 280, transmit processor 264, TX MIMO processor 266, antenna 252, modem 254, MIMO detector 256, receive processor 258, or the like.

In some aspects, network node 110 may include means for transmitting an indication of a HARQ process identifier pool associated with the UE 120, means for receiving an indication of a HARQ process identifier among a plurality of HARQ process identifiers included in the HARQ process identifier pool, and/or means for receiving an uplink communication associated with the HARQ process identifier, among other examples. In some aspects, such means may include one or more components of network node 110 described in connection with FIG. 2, such as antenna 234, MIMO detector 236, receive processor 238, controller/processor 240, transmit processor 220, TX MIMO processor 230, modem 232, antenna 234, or the like.

Figure 3:
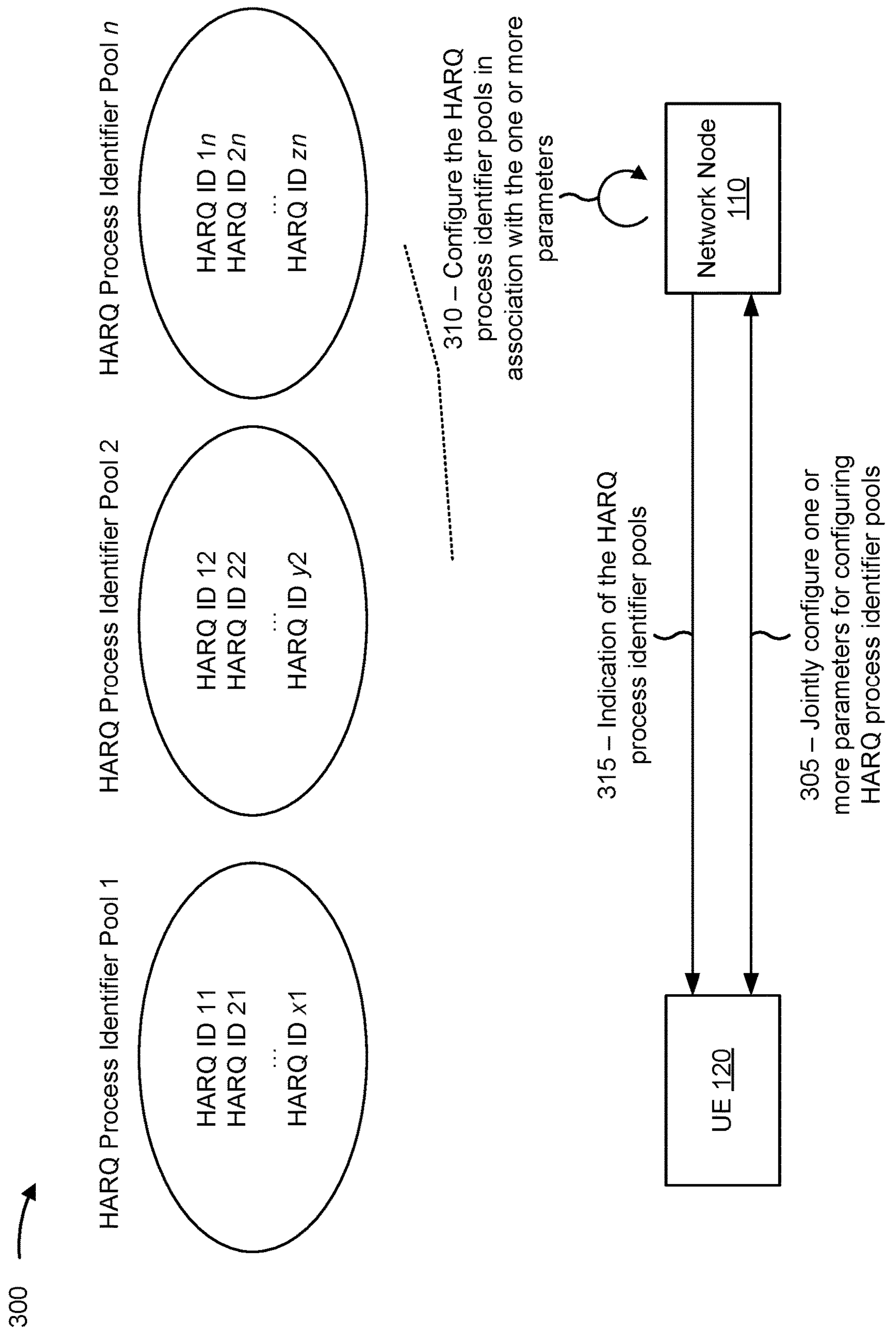
FIG. 3 is a diagram of an example of configuring hybrid automatic repeat request (HARQ) process identifier pools.

FIG. 3 is a diagram of an example 300 of configuring HARQ process identifier pools. As shown in FIG. 3, the example 300 may include communication between a network node 110 and a UE 120. The network node 110 and the UE 120 may be included in a wireless network, such as the wireless network 100. The network node 110 and the UE 120 may communicate on an access link or air interface, which may include an uplink and a downlink.

The UE 120 may be allocated a plurality of HARQ process identifiers for tracking a plurality of HARQ processes at the UE 120 for uplink communication. The UE 120 may use a HARQ process to track HARQ feedback and/or retransmissions of uplink communications transmitted by the UE 120. Allocating a plurality of HARQ processes for the UE 120 enables the UE 120 to track HARQ feedback for a plurality of uplink communications simultaneously, which reduces uplink latency for the UE 120 and/or increases uplink throughput for the UE 120. The UE 120 may assign HARQ processes to packets included in a transmission buffer of the UE 120 (which may correspond to the data source 262 of the UE 120) that are awaiting a scheduling grant for uplink resources that the UE 120 may use to transmit the packets in an uplink communication to the network node 110.

HARQ feedback may include, for example, an acknowledgement (ACK) for an uplink communication or a negative acknowledgement (NACK) for an uplink communication. An ACK received for an uplink communication may indicate to the UE 120 that the uplink communication was successfully received at the network node 110. A NACK received for an uplink communication may indicate to the UE 120 that the uplink communication was not successfully received at the network node 110.

In some aspects, the UE 120 may retransmit an uplink communication based on or otherwise in association with receiving a NACK for the uplink communication. Alternatively, such as in scenarios in which a delay parameter for an uplink communication does allow adequate time for retransmissions of the uplink communication, the UE 120 may not transmit a retransmission for a received NACK (for example, if retransmissions for the HARQ process associated with the uplink communication are disabled).

A HARQ process identifier pool may refer to a set of one or more HARQ process identifiers that are allocated to, assigned to, and/or are otherwise associated with a particular UE 120. Each HARQ process identifier pool may provide the UE 120 with HARQ process identifiers that are selectable by the UE 120 for new data transmissions (uplink communications that carry new data) and/or for retransmissions (uplink communications that carry data that was previously transmitted by the UE 120). The HARQ process identifier(s) that are included in a HARQ process identifier pool may be based on or otherwise associated one or more parameters. The one or more parameters may include a transport block size for uplink communications transmitted by the UE 120, an uplink communication priority (or packet priority of packets that are to be included in an uplink communication), a quality of service (QOS) parameter, a $T_{wait}$ parameter, package delay budget (PDB), an energy profile associated with the UE 120, and/or another parameter.

At 305, the network node 110 and the UE 120 may cooperate to configure the one or more parameters that the network node 110 is to use to configure the HARQ process identifier pool(s) and/or the HARQ process identifier(s) that are to be included in the HARQ process identifier pool(s) associated with the UE 120. In some examples, the network node 110 and the UE 120 may cooperate to configure a transport block size that is to be used to configure the HARQ process identifier pool(s) and/or the HARQ process identifier(s) that are to be included in the HARQ process identifier pool(s).

In some examples, the network node 110 and the UE 120 may cooperate to configure one or more QoS classes that are to be used to configure the HARQ process identifier pool(s) and/or the HARQ process identifier(s) that are to be included in the HARQ process identifier pool(s). For example, the network node 110 and the UE 120 may cooperate to configure a first QoS class for a first HARQ process identifier pool (such that the network node selects HARQ process identifiers for the first HARQ process identifier pool that satisfy the first QoS class), may configure a second QoS class for a second HARQ process identifier pool, and so on. In some another examples, the network node 110 and the UE 120 may cooperate to configure one or more other QoS parameters, such as data rate, latency, reliability, availability, and/or traffic prioritization, among other examples, for configuring the HARQ process identifier pool(s) and/or the HARQ process identifier(s) that are to be included in the HARQ process identifier pool(s).

In some examples, the HARQ process contains a MAC PDU or transport blocks which carrier data from multiple LCHs or IP packets. The HARQ ID process delay budget is the minimum delay budget across all packets that the MAC PDU carries.

In some examples, the network node 110 and the UE 120 may cooperate to configure a remaining PDB parameter that is to be used to configure the HARQ process identifier pool(s) and/or the HARQ process identifier(s) that are to be included in the HARQ process identifier pool(s). Packet delay budget (or PDB) refers to an upper bound or maximum amount of time delay that a packet associated with an uplink communication may experience between the UE 120 and the network node 110. The PDB may account for time between the packet arriving at a packet data convergence protocol (PDCP) layer of the UE 120 as a service data unit (SDU) and the packet arriving at the PDCP layer of the network node 110 as a PDCP protocol data unit (PDU). The time durations and/or delays between the PDCP layers of the UE 120 and the network node 110 are to fit within the PDB, and may include a $T_{wait}$ parameter and a $T_{air}$ parameter. The $T_{wait}$ parameter may include a PDCP queueing delay that is the delay from packet arrival at the PDCP layer at the UE 120 until an uplink grant to transmit the packet is available, which includes the delay in the UE 120 receiving granted uplink resources from sending a scheduling request (SR). The $T_{air}$ parameter may include the time duration from the first reception (even if unsuccessful) of the first medium access control (MAC) PDU of an associated SDU to the successful reception of the last MAC PDU of the SDU.

In some examples, since the network node 110 is not aware of $T_{wait}$ for packets that the UE 120 transmits in uplink communications to the network node 110, the UE 120 may provide input regarding $T_{wait}$ parameter selection to the network node 110 for configuring the HARQ process identifier pool(s) and/or the HARQ process identifier(s) that are to be included in the HARQ process identifier pool(s).

In some examples, the network node 110 and the UE 120 may cooperate to configure one or more energy profile parameters that are to be used to configure the HARQ process identifier pool(s) and/or the HARQ process identifier(s) that are to be included in the HARQ process identifier pool(s). An energy profile associated with the UE 120 may indicate a type of energy usage for the UE 120. For example, the energy profile associated with the UE 120 may indicate that the UE 120 is a low-power-consumption device (such as a reduced capability (RedCap) UE or an NB-IoT device) and/or an energy harvesting device (such as a zero-power IoT device), among other examples. The energy profile may indicate one or more energy parameters associated with energy usage of the UE 120, such as a charging rate profile associated with the UE (a profile indicating a charging rate for the UE 120), a discharging rate profile associated with the UE (a profile indicating a discharge rate under particular usage conditions for the UE 120), and/or an energy level profile associated with the UE 120, among other examples.

In some aspects, the UE 120 may cooperate to coordinate the one or more parameters with the network node 110 by transmitting indications of proposed parameters to the network node 110 for acceptance by the network node 110. The UE 120 may transmit an indication of a proposed parameter in an uplink communication, such as a layer 1 (L1) uplink communication (for example, an uplink control information (UCI) communication), a layer 2 (L2) uplink communication (for example, an uplink MAC control element (MAC-CE) communication), and/or a layer 3 (L3) uplink communication (for example, an uplink RRC communication), among other examples.

At 310, the network node 110 may configure the HARQ process identifier pools for the UE 120. For example, the network node 110 may configure a first HARQ process identifier pool (indicated in FIG. 3 as HARQ Process Identifier pool 1) that includes HARQ process identifiers (HARQ IDs) 11, 21, and so on to x1; a second HARQ process identifier pool (indicated in FIG. 3 as HARQ Process Identifier pool 2) that includes HARQ process identifiers 12, 22, and so on to y2; and so on to an nth HARQ process identifier pool (indicated in FIG. 3 as HARQ Process Identifier pool n) that includes HARQ process identifiers 1*n*, 2*n,* and so on to zn. In some aspects, the network node 110 may configure the HARQ process identifier pools in association with the one or more parameters. In some aspects, the network node may configure the HARQ process identifier pools such that the HARQ process identifiers included in the HARQ process identifier pools satisfy the one or more parameters that were configured based on and/or otherwise in association with cooperation between the network node 110 and the UE 120.

In some aspects, the network node 110 may restrict particular HARQ process identifiers for particular types of uplink communications. For example, the network node 110 may restrict particular HARQ process identifiers for retransmissions so as to retain some control over selection of HARQ process identifiers by the UE 120. The network node 110 may be aware of the PDB for an uplink communication in that the network node 110 may be aware of the SR occasion that was used to trigger a buffer status report (BSR) for transmitting packets in a packet buffer of the UE 120. While the network node 110 may not be aware of the remaining PDB for the uplink communication (because the UE 120, and not the network node 110, is aware of the $T_{wait}$ time for the packets of the uplink communication), the network node 110 may still permit selection of some HARQ process identifiers over other HARQ process identifiers in association with the PDB for the packets of the uplink communication. However, and as described in connection with FIG. 4, the UE 120 is permitted to downselect from the HARQ process identifiers included in a HARQ process identifier pool configured by the network node 110 for an uplink communication based on or otherwise in association with a delay parameter (such as remaining PDB or $T_{wait}$ for the uplink communication).

At 315, the network node 110 may transmit, to the UE 120, an indication of the one or more HARQ process identifier pools and/or an indication of the one or more HARQ process identifiers included in the one or more HARQ process identifier pools. The UE 120 may receive the indication of the one or more HARQ process identifier pools and/or the indication of the one or more HARQ process identifiers included in the one or more HARQ process identifier pools. The network node 110 may transmit (and the UE 120 may receive) the indication of the one or more HARQ process identifier pools and/or the indication of the one or more HARQ process identifiers included in the one or more HARQ process identifier pools in a downlink communication, such as an L1 downlink communication (for example, a DCI communication), an L2 downlink communication (for example, a downlink MAC-CE communication), and/or an L3 downlink communication (for example, a downlink RRC communication), among other examples.

In some aspects, the network node 110 may transmit (and the UE 120 may receive) the indication of the one or more HARQ process identifier pools and/or the indication of the one or more HARQ process identifiers included in the one or more HARQ process identifier pools in a configuration associated with the UE 120. The configuration may include an RRC configuration, a DCI configuration, and/or another type of configuration.

In some aspects, the network node 110 may transmit (and the UE 120 may receive) an explicit indication of the HARQ process identifiers that are included in a HARQ process identifier pool. For example, the network node 110 may transmit (and the UE 120 may receive) a downlink communication that explicitly indicates each of the HARQ process identifiers.

In some aspects, the network node 110 may transmit (and the UE 120 may receive) an implicit indication of one or more HARQ process identifiers that are included in a HARQ process identifier pool. For example, if the HARQ process identifiers included in the HARQ process identifier pool are sequential HARQ process identifiers (such as HARQ process identifier 1 through HARQ process identifier 6), the network node 110 may transmit (and the UE 120 may receive) a downlink communication that explicitly indicates a starting HARQ process identifier (the HARQ process identifier 1) and a length or quantity of HARQ process identifiers included in the HARQ process identifier pool (6 HARQ process identifiers). The UE 120 may determine that the HARQ process identifier pool includes the HARQ process identifier 1 through HARQ process identifier 6 based on or otherwise in association with the explicit indication of the starting HARQ process identifier and the indication of the length or quantity of HARQ process identifiers included in the HARQ process identifier pool.

In some aspects, the network node 110 may further transmit (and the UE 120 may further receive) an input for facilitating selection of a HARQ process identifier by the UE 120. The input may include a configuration, an indication of one or more thresholds, an indication of one or more preferred HARQ process identifiers, and/or another input, among other examples. The configuration may include a configuration that may be used by the UE 120 to downselect from the HARQ process identifiers and/or HARQ process identifier pools indicated by the network node 110. For example, HARQ process identifier pools and/or HARQ process identifiers within a HARQ process identifier pool may be associated with a particular bandwidth part (BWP) configuration, a particular control resource set (CORESET) configuration, and/or another type of configuration. If the network node 110 provides the UE 120 with a particular BWP configuration, for example, the UE 120 may downselect from the HARQ process identifiers and/or HARQ process identifier pools associated with the particular BWP configuration.

In some aspects, the network node 110 may further transmit (and the UE 120 further receive) an indication of the one or more thresholds that the UE 120 can use to downselect from the HARQ process identifiers and/or HARQ process identifier pools indicated by the network node 110. In some aspects, the thresholds may be configured per logical channel (LCH) associated with the UE 120. For example, the network node 110 may transmit (and the UE 120 receive) an indication of a $T_{wait}$ threshold. If the $T_{wait}$ time duration associated with an uplink communication satisfies the $T_{wait}$ threshold, the UE 120 may select from a first HARQ process identifier pool (or may select a first HARQ process identifier) associated with a first logical channel, or, if the $T_{wait}$ time duration associated with the uplink communication does not satisfy the $T_{wait}$ threshold, the UE 120 may select from a second HARQ process identifier pool (or may select a second HARQ process identifier) associated with a second logical channel.

In some aspects, the network node 110 may further transmit (and the UE 120 may further receive) the indication of one or more preferred HARQ process identifiers and/or one or more preferred HARQ process identifier pools among the HARQ process identifiers and/or HARQ process identifier pools indicated by the network node 110. The UE 120 may select a HARQ process identifier pool and/or a HARQ process identifier from the one or more preferred HARQ process identifiers and/or the one or more preferred HARQ process identifier pools for an uplink communication. The network node 110 may determine the one or more preferred HARQ process identifiers and/or the one or more preferred HARQ process identifier pools based on or otherwise in association with the quality of prior uplink communications and/or the awareness of the network node 110 of the uplink PDB for the uplink communication, among other examples.

Figure 4:
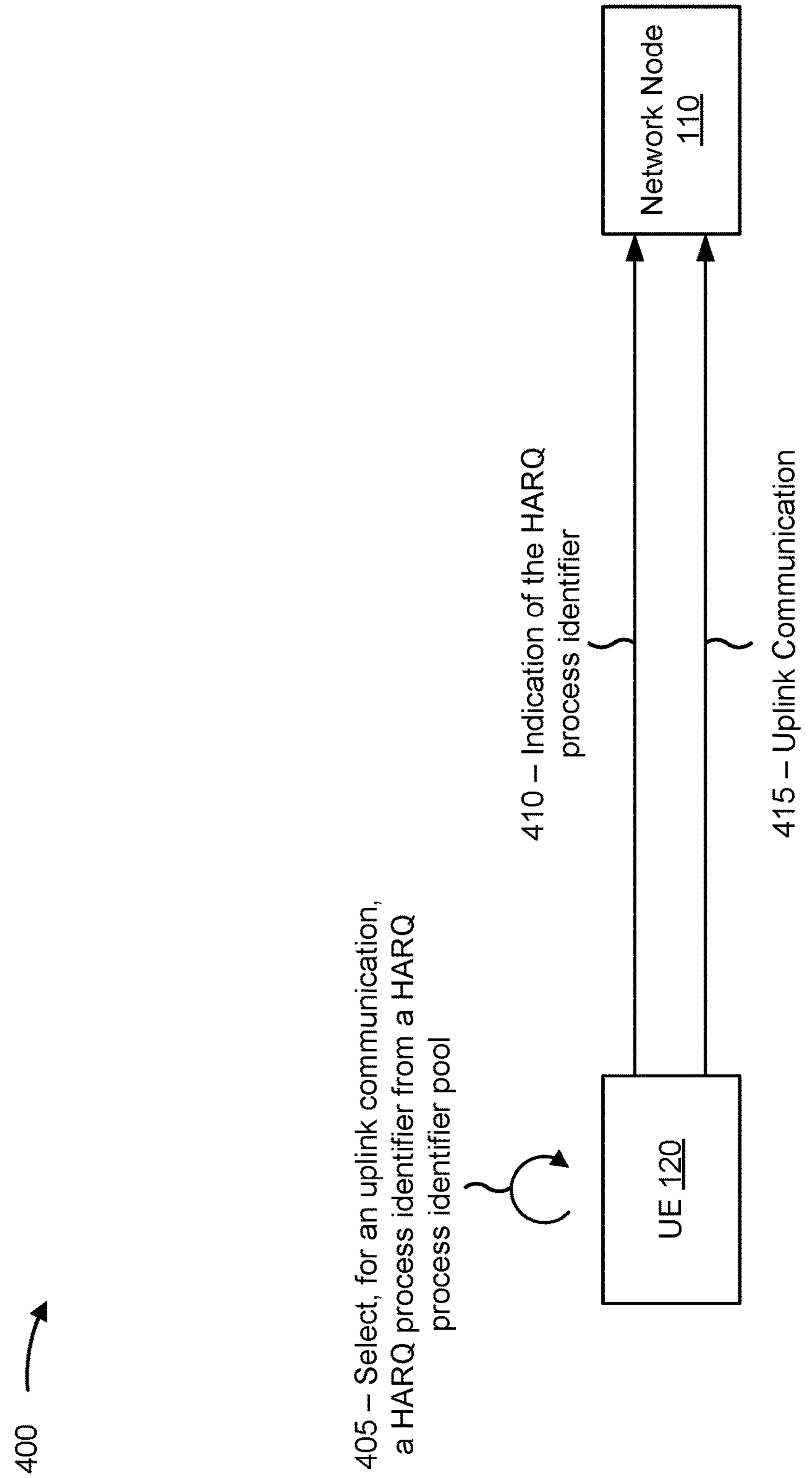
FIG. 4 is a diagram of an example of prioritizing HARQ process identifiers and selection of a HARQ process identifier from a HARQ process identifier pool for an uplink communication.

FIG. 4 is a diagram of an example 400 of prioritizing HARQ process identifiers and selection of a HARQ process identifier from a HARQ process identifier pool for an uplink communication. As shown in FIG. 3, the example 300 may include communication between a network node 110 and a UE 120. The network node 110 and the UE 120 may be included in a wireless network, such as the wireless network 100. The network node 110 and the UE 120 may communicate on an access link or air interface, which may include an uplink and a downlink.

At 405, the UE 120 may select, for an uplink communication that is to be transmitted to the network node 110, a HARQ process identifier from a HARQ process identifier pool associated with the UE 120. The network node 110 may provide the UE 120 with an indication of the HARQ process identifiers included in the HARQ process identifier pool, as described above in connection with FIG. 3, for example.

In some aspects, the UE 120 may select the HARQ process identifier based on or otherwise in association with a delay parameter associated with the uplink communication. The delay parameter may include a priority associated with the uplink communication, a QoS class (or another type of QoS parameter) associated with the uplink communication, a $T_{wait}$ parameter associated with the uplink communication, a remaining PDB associated with the uplink communication, and/or another type of delay parameter.

As indicated above in connection with FIG. 3, the network node 110 may configure HARQ process identifier pools and/or HARQ process identifiers that satisfy one or more parameters configured based on and/or otherwise in association with cooperation between the network node 110 and the UE 120. The UE 120 may select the HARQ process pool and/or the HARQ process identifier from the HARQ process pool that satisfies the delay parameter. For example, the UE 120 may select a HARQ process identifier that is associated with a $T_{wait}$ parameter that satisfies the $T_{wait}$ time for the uplink communication. As another example, the UE 120 may select a HARQ process identifier that is associated with a PDB parameter that satisfies the remaining PDB for the uplink communication. As another example, the UE 120 may select a HARQ process identifier that associated with a latency parameter that satisfies a latency requirement for the uplink communication. As another example, the UE 120 may select a HARQ process identifier that associated with a traffic prioritization parameter that satisfies or matches the priority of the uplink communication. As another example, the UE 120 may select a HARQ process identifier, for which retransmissions are disabled, for the uplink communication if the UE 120 does not expect to perform retransmissions for the uplink communication.

As indicated above in connection with FIG. 3, the network node 110 may transmit (and the UE 120 may receive) an indication of a threshold for selecting the HARQ process identifier for the uplink communication. The threshold may be a delay threshold (such as a $T_{wait}$ threshold) associated with the delay parameter. The UE 120 may select a HARQ process identifier for the uplink communication in association with whether the delay parameter satisfies the delay threshold. For example, if the UE 120 determines that the delay parameter does not satisfy the delay threshold, the UE 120 may select a first HARQ process identifier, whereas the UE 120 may select a second HARQ process identifier if the UE 120 determines that the delay parameter does satisfy the delay threshold.

As indicated above in connection with FIG. 3, the network node 110 may transmit (and the UE 120 may receive) an indication of a preferred subset of HARQ process identifiers included in the HARQ process identifier pool. The UE 120 may select the HARQ process identifier from the preferred subset of HARQ process identifiers.

Additionally and/or alternatively, the UE 120 may select the HARQ process identifier based on or otherwise in association with an energy profile associated with the UE 120. The energy profile may include a charging rate profile associated with the UE 120, a discharging rate profile associated with the UE 120, an energy level profile associated with the UE 120, and/or another energy profile associated with the UE 120. For example, the UE 120 may select, in association with an energy profile associated with the UE, a subset of HARQ process identifiers from the HARQ process identifier pool, and may select the HARQ process identifier from the subset of HARQ process identifiers. The energy profile enables the UE 120 to select a subset of surviving HARQ process identifiers (HARQ process identifiers and packets for which the associated PDB has not expired) within the HARQ process identifier pool. For expired PDBs, the UE 120 may flush the transmission buffer of the UE 120 of associated packets (since the UE 120 cannot satisfy the PDBs for these packets), and may select from the remaining (surviving) HARQ process identifiers and associated packets. The UE 120 may start with flushing the lowest priority packets from the transmission buffer, and may continue with higher priority packets that are likely to expire (or will expire) before the next uplink grant (dynamic or configured) is received. The UE 120 may transmit (and the network node 110 may receive) an indication of the surviving HARQ process identifiers and, in some examples, an indication of the HARQ process identifier that will be selected from the surviving HARQ process identifiers.

At 410, the UE 120 may transmit an indication of the HARQ process identifier to the network node 110. The network node 110 may receive the indication of the HARQ process identifier from the UE 120. In some aspects, the UE 120 may transmit (and the network node 110 may receive) the indication of the HARQ process identifier in an L1 uplink communication (for example, a UCI communication for dynamic grant scheduling of the uplink communication associated with the HARQ process identifier), in an L2 uplink communication (for example, an uplink MAC-CE communication), in an L3 uplink communication (for example, an uplink RRC communication for configured grant scheduling of the uplink communication associated with the HARQ process identifier), and/or in another type of uplink communication.

In some aspects, the UE 120 may indicate the HARQ process identifier using a bitmap. For example, the UE 120 may transmit a UCI communication that includes a bitmap, where each position in the bitmap corresponds to a HARQ process identifier in the HARQ process identifier pool. As an example, a 0 0 0 0 bitmap may be used to indicate up to 4 HARQ process identifiers (HARQ process identifier 1, HARQ process identifier 2, HARQ process identifier 3, and HARQ process identifier 4, for example) in the UCI communication. A 0-value in the bitmap may correspond to an associated HARQ process identifier not being selected, and a 1-value in the bitmap may correspond to an associated HARQ process identifier being selected. As an example, a 0 100bitmap may be used to indicate that HARQ process identifier 2 is selected for the associated uplink communication. Alternatively, 1-value in the bitmap may correspond to an associated HARQ process identifier not being selected, and a 0-value in the bitmap may correspond to an associated HARQ process identifier being selected.

In some aspects, the UE 120 may indicate the HARQ process identifier using a codepoint. For example, the UE 120 may transmit a UCI communication that includes a field for indicating the HARQ process identifier, and the field may be configured as a codepoint. The codepoint may include one or more bits for which particular combinations of values for the one or more bits are associated with respective HARQ process identifiers. The UE 120 may determine the quantity of bits M for the codepoint based on or otherwise in association with $M=\log_2(N)$, where N corresponds to the quantity of HARQ process identifiers included in the HARQ process identifier pool. For example, for a HARQ process identifier pool that includes 4 HARQ process identifiers (N=4), the UE 120 may determine that $M=\log_2(N)=2$ bits. Accordingly, a 00 codepoint value may correspond to a HARQ process identifier 1, a 01 codepoint value may correspond to a HARQ process identifier 2, a 10 codepoint value may correspond to a HARQ process identifier 3, and a 11 codepoint value may correspond to a HARQ process identifier 4.

At 415, the UE 120 may transmit the uplink communication associated with the selected HARQ process identifier indicated at 410. The network node 110 may receive the uplink communication. The uplink communication may include a UCI communication, an uplink MAC-CE communication, an uplink RRC communication, an uplink control communication (for example, a physical uplink control channel (PUCCH) communication that includes control information), an uplink data communication (for example, a physical uplink shared channel (PUSCH) communication that includes data), and/or another type of uplink communication. In some aspects, the uplink communication is a first transmission or an initial transmission of the uplink communication, and the selected HARQ process identifier is associated with the first/initial transmission of the uplink communication. In some aspects, the uplink communication is a retransmission of the uplink communication, and the selected HARQ process identifier is associated with the retransmission of the uplink communication. In some aspects, the UE 120 may select different HARQ process identifiers for a first/initial transmission of the uplink communication and for a retransmission of the uplink communication.

In some aspects, the UE 120 selects packets from the transmission buffer (for example, the data source 262) of the UE 120 for transmitting in one or more transport blocks of the uplink communication. In some examples, all of the data packets in a transmission buffer of the UE 120 may be expired by the time the UE 120 receives an uplink grant. In these examples, the UE 120 may select, from the data packets in the transmission buffer, a subset of data packets for the uplink communication in association with one or more parameters. The one or more parameters may include, for example, an expiration time associated with the subset of data packets, a selection order parameter, a first-in-first-out (FIFO) parameter, and/or another parameter. Instead of selecting one fresh packet and one or more expired or expiring packets from a set of configured HARQ process identifiers in a HARQ process identifier pool, the UE 120 may select one of the fresh packets (packets that have most of the associated PDB remaining) that have the longest wait time or that have a combination of priorities, QoS, and/or $T_{wait}$. From the expiring packets, the UE 120 may select a packet with a combination of priority and remaining PDB or wait time, among other examples. If a packet's remaining PDB is zero, the UE 120 may still transmit the packet if nothing else remains in the transmission buffer with a non-zero remaining PDB.

Figure 5:
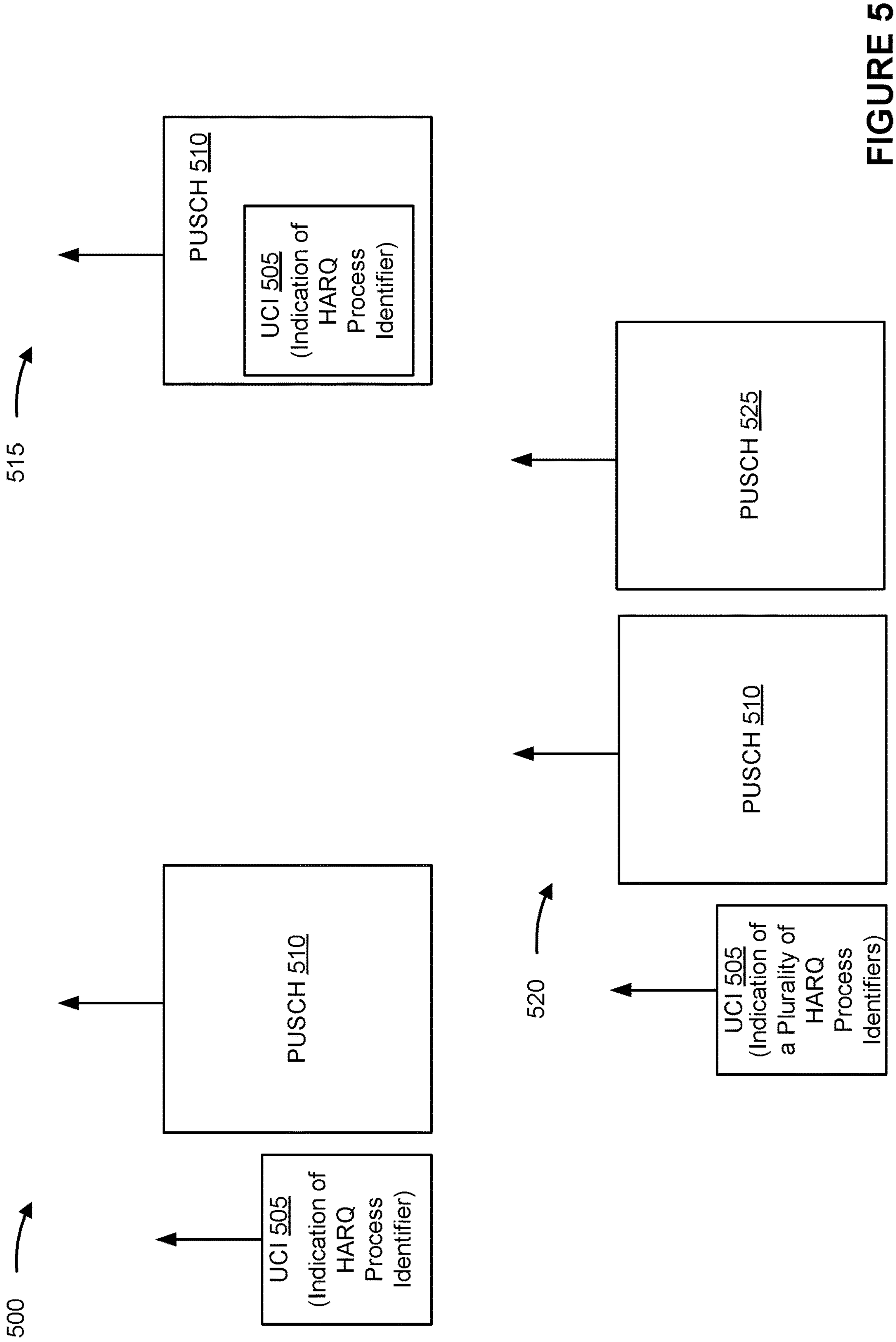
FIG. 5 is a diagram of examples of indicating a selection of a HARQ process identifier from a HARQ process identifier pool.

FIG. 5 is a diagram of examples of indicating a selection of a HARQ process identifier from a HARQ process identifier pool. The examples may be used by the UE 120 for indicating a HARQ process identifier from a HARQ process identifier pool to a network node 110, such as at 410 in FIG. 4, for example.

As shown in an example 500 in FIG. 5, the UE 120 may transmit UCI 505 to indicate selection of a HARQ process identifier. The UE 120 may transmit (and the network node 110 may receive) the UCI 505 in an uplink control communication, such as a PUCCH communication. As further shown in the example 500, the UE 120 may transmit a PUSCH 510 associated with the UCI 505. The PUSCH 510 may include an uplink communication (for example, an uplink data communication) associated with the HARQ process identifier indicated in the UCI 505. The UCI 505 and the PUSCH 510 may be transmitted (and received) in different sets of uplink resources. For example, the UE 120 may transmit (and the network node 110 may receive) the UCI 505 in a first set of uplink resources, which may include one or more first uplink time domain resources (such as slots, symbols, and/or half symbols, among other examples) and/or one or more first uplink frequency domain resources (such as subcarriers, resource blocks, and/or resource elements, among other examples). The UE 120 may transmit (and the network node 110 may receive) the PUSCH 510 in a second set of uplink resources, which may include one or more second uplink time domain resources (that are different from the one or more first uplink time domain resources) and/or one or more second uplink frequency domain resources (that are different from the one or more first uplink frequency domain resources).

As shown in an example 515 in FIG. 5, the UE 120 may alternatively transmit the UCI 505 (that includes the indication of the HARQ process identifier) in a subset of the uplink resources allocated for the PUSCH 510. This may be referred to as UCI on PUSCH or UCI piggyback on PUSCH. Transmitting the UCI 505 and the PUSCH 510 in separate uplink resources (as illustrated in the example 500) enables a greater amount of data to be transmitted in the PUSCH 510 (and reduces the likelihood of puncturing the PUSCH 510). However, transmitting the UCI 505 in the subset of uplink resources allocated for the PUSCH 510 reduces the overall amount of uplink resources consumed for indicating the HARQ process identifier.

As shown in an example 520 in FIG. 5, the UE 120 may transmit an indication of a plurality of HARQ process identifiers in the UCI 505. This enables the UE 120 to indicate HARQ process identifiers for a plurality of PUSCHs (PUSCH 510 and PUSCH 525, for example) in a single UCI (as opposed to transmitting separate UCI communications to indicate the HARQ process identifiers individually for each PUSCH).

Additionally and/or alternatively, the UE 120 may configure the UCI 505 in any of the examples illustrated in FIG. 5 to indicate one or more HARQ process identifier pools from which the UE 120 is to select a HARQ process identifier for a subsequent PUSCH. For example, the UE 120 may transmit a first UCI to indicate a first HARQ process identifier pool from which the UE 120 will select a HARQ process identifier for a first PUSCH, the UE 120 may transmit a second UCI to indicate a second HARQ process identifier pool from which the UE 120 will select a HARQ process identifier for a second PUSCH, and so on.

Figure 6:
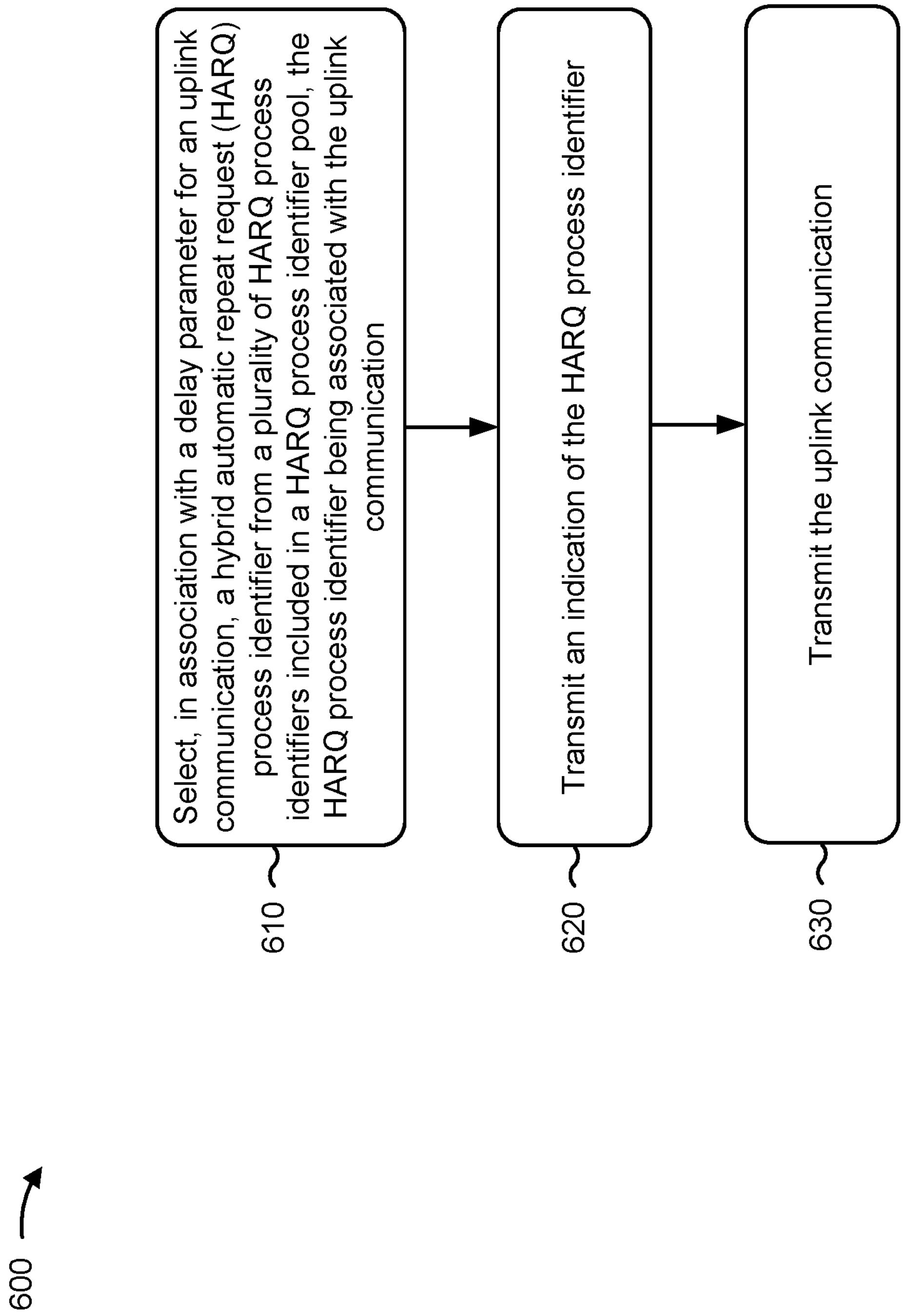
FIG. 6 is a flowchart illustrating an example process performed, for example, by a UE that supports flexible selection of a HARQ process identifier from a HARQ process identifier pool.

FIG. 6 is a flowchart illustrating an example process 600 performed, for example, by a UE that supports flexible selection of a HARQ process identifier from a HARQ process identifier pool. Example process 6 is an example where the UE (for example, a UE 120) performs operations associated with flexible selection of a HARQ process identifier from a HARQ process identifier pool.

As shown in FIG. 6, in some aspects, process 600 may include selecting, in association with a delay parameter for an uplink communication, a HARQ process identifier from a plurality of HARQ process identifiers included in a HARQ process identifier pool, the HARQ process identifier being associated with the uplink communication (block 610). For example, the UE (such as by using communication manager 140 or selection component 808, depicted in FIG. 8) may select, in association with a delay parameter for an uplink communication, a HARQ process identifier from a plurality of HARQ process identifiers included in a HARQ process identifier pool, the HARQ process identifier being associated with the uplink communication, as described above.

As further shown in FIG. 6, in some aspects, process 600 may include transmitting an indication of the HARQ process identifier (block 620). For example, the UE (such as by using communication manager 140 or transmission component 804, depicted in FIG. 8) may transmit an indication of the HARQ process identifier, as described above.

As further shown in FIG. 6, in some aspects, process 600 may include transmitting the uplink communication (block 630). For example, the UE (such as by using communication manager 140 or transmission component 804, depicted in FIG. 8) may transmit the uplink communication, as described above.

Process 600 may include additional aspects, such as any single aspect or any combination of aspects described below or in connection with one or more other processes described elsewhere herein.

In a first additional aspect, the delay parameter comprises at least one of a priority associated with the uplink communication, a QoS class associated with the uplink communication, a $T_{wait}$ parameter associated with the uplink communication, or a remaining packet delay budget associated with the uplink communication.

In a second additional aspect, alone or in combination with the first aspect, process 600 includes receiving an indication of the HARQ process identifier pool in at least one of an RRC configuration or a DCI configuration.

In a third additional aspect, alone or in combination with one or more of the first and second aspects, process 600 includes receiving an explicit indication of the plurality of HARQ process identifiers included in the HARQ process identifier pool.

In a fourth additional aspect, alone or in combination with one or more of the first through third aspects, process 600 includes receiving an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

In a fifth additional aspect, alone or in combination with one or more of the first through fourth aspects, selecting the HARQ process identifier comprises selecting, in association with an energy profile associated with the UE, a subset of HARQ process identifiers from the plurality of HARQ process identifiers included in the HARQ process identifier pool, and selecting the HARQ process identifier from the subset of HARQ process identifiers.

In a sixth additional aspect, alone or in combination with one or more of the first through fifth aspects, the energy profile comprises at least one of a charging rate profile associated with the UE, a discharging rate profile associated with the UE, or an energy level profile associated with the UE.

In a seventh additional aspect, alone or in combination with one or more of the first through sixth aspects, process 600 includes transmitting an indication of the subset of HARQ process identifiers.

In an eighth additional aspect, alone or in combination with one or more of the first through seventh aspects, the HARQ process identifier pool is one of a plurality of HARQ process identifier pools associated with the UE, and process 600 includes selecting the HARQ process identifier pool from the plurality of HARQ process identifier pools.

In a ninth additional aspect, alone or in combination with one or more of the first through eighth aspects, process 600 includes cooperating with a network node to configure one or more parameters for assigning HARQ process identifiers to the plurality of HARQ process identifier pools.

In a tenth additional aspect, alone or in combination with one or more of the first through ninth aspects, the one or more parameters comprise at least one of a priority associated with the uplink communication, a QoS class associated with the uplink communication, a $T_{wait}$ parameter associated with the uplink communication, a remaining packet delay budget associated with the uplink communication, or an energy profile associated with the UE.

In an eleventh additional aspect, alone or in combination with one or more of the first through tenth aspects, process 600 includes selecting, in association with another uplink communication, another HARQ process identifier from the plurality of HARQ process identifiers included in the HARQ process identifier pool, and transmitting an indication of the other HARQ process identifier along with the indication of the HARQ process identifier.

In a twelfth additional aspect, alone or in combination with one or more of the first through eleventh aspects, the indication of the HARQ process identifier and the indication of the other HARQ process identifier are included in a bitmap in a UCI communication.

In a thirteenth additional aspect, alone or in combination with one or more of the first through twelfth aspects, the indication of the HARQ process identifier and the indication of the other HARQ process identifier are included in respective codepoints in a UCI communication.

In a fourteenth additional aspect, alone or in combination with one or more of the first through thirteenth aspects, transmitting the indication of the HARQ process identifier comprises transmitting the indication of the HARQ process identifier in a UCI communication in one or more first uplink resource, where transmitting the uplink communication comprises transmitting the uplink communication in one or more second uplink resources that are different from the one or more first uplink resources.

In a fifteenth additional aspect, alone or in combination with one or more of the first through fourteenth aspects, transmitting the indication of the HARQ process identifier comprises transmitting the indication of the HARQ process identifier in a subset of uplink resources in which the uplink communication is transmitted.

In a sixteenth additional aspect, alone or in combination with one or more of the first through fifteenth aspects, transmitting the indication of the HARQ process identifier comprises transmitting the indication of the HARQ process identifier in a MAC-CE communication.

In a seventeenth additional aspect, alone or in combination with one or more of the first through sixteenth aspects, transmitting the indication of the HARQ process identifier comprises transmitting the indication of the HARQ process identifier in an RRC communication.

In an eighteenth additional aspect, alone or in combination with one or more of the first through seventeenth aspects, process 600 receiving an indication of a delay threshold associated with the delay parameter, and wherein selecting the HARQ process identifier comprises selecting the HARQ process identifier in association with whether the delay parameter satisfies the delay threshold.

In a nineteenth additional aspect, alone or in combination with one or more of the first through eighteenth aspects, receiving the indication of the delay threshold comprises receiving an indication of respective delay thresholds associated with each of a plurality of logical channels of the UE, wherein each of the plurality of logical channels is associated with a particular one of the plurality of HARQ process identifiers included in the HARQ process identifier pool.

In a twentieth additional aspect, alone or in combination with one or more of the first through nineteenth aspects, receiving an indication of a preferred subset of HARQ process identifiers of the plurality of HARQ process identifiers included in the HARQ process identifier pool, wherein selecting the HARQ process identifier comprises selecting the HARQ process identifier from the preferred subset of HARQ process identifiers.

In a twenty-first additional aspect, alone or in combination with one or more of the first through twentieth aspects, transmitting the uplink communication comprises transmitting an initial transmission of the uplink communication, wherein the HARQ process identifier is associated with the initial transmission of the uplink communication.

In a twenty-second additional aspect, alone or in combination with one or more of the first through twenty-first aspects, transmitting the uplink communication comprises transmitting a retransmission of the uplink communication, wherein the HARQ process identifier is associated with the retransmission of the uplink communication.

In a twenty-third additional aspect, alone or in combination with one or more of the first through twenty-second aspects, all data packets in a transmission buffer of the UE are expired, and process 600 includes selecting, from the data packets in the transmission buffer, a subset of data packets for the uplink communication in association with at least one of an expiration time associated with the subset of data packets, a selection order parameter, or a FIFO parameter.

In a twenty-fourth additional aspect, alone or in combination with one or more of the first through twenty-third aspects, process 600 includes configuring a plurality of HARQ process identifier pools associated with a plurality of delay parameters, wherein the HARQ process identifier pools is included in the plurality of HARQ process identifier pools, and wherein the delay parameter is included in the plurality of delay parameters; and mapping logical channels to the plurality of HARQ process identifier pools, wherein selecting the HARQ process identifier comprises: prioritizing the HARQ process identifier in association with the plurality of delay parameters.

In a twenty-fifth additional aspect, alone or in combination with one or more of the first through twenty-fourth aspects, process 600 includes receiving a configuration of a quantity of HARQ process pool and receiving a configuration of a mapping rule of HARQ processes to HARQ process pools in association with the delay parameter.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
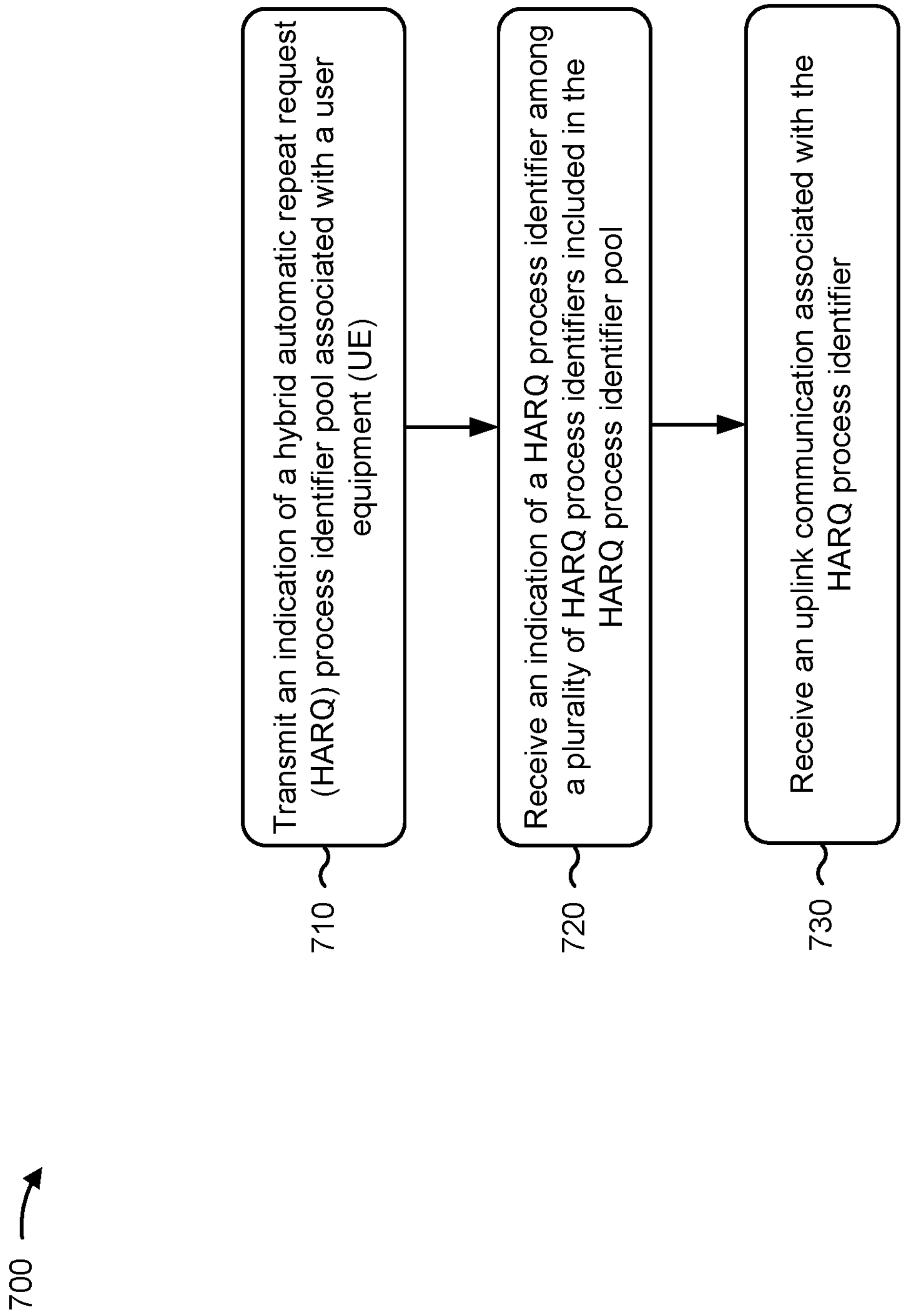
FIG. 7 is a flowchart illustrating an example process performed, for example, by a network node that supports flexible selection of a HARQ process identifier from a HARQ process identifier pool.

FIG. 7 is a flowchart illustrating an example process 700 performed, for example, by a network node that supports flexible selection of a HARQ process identifier from a HARQ process identifier pool. Example process 6 is an example where the network node (for example, a network node 110) performs operations associated with flexible selection of a HARQ process identifier from a HARQ process identifier pool.

As shown in FIG. 7, in some aspects, process 700 may include transmitting an indication of a HARQ process identifier pool associated with a UE (block 710). For example, the UE (such as by using communication manager 150 or transmission component 904, depicted in FIG. 9) may transmit an indication of a HARQ process identifier pool associated with a UE, as described above.

As further shown in FIG. 7, in some aspects, process 700 may include receiving an indication of a HARQ process identifier among a plurality of HARQ process identifiers included in the HARQ process identifier pool (block 720). For example, the UE (such as by using communication manager 150 or reception component 902, depicted in FIG. 9) may receive an indication of a HARQ process identifier among a plurality of HARQ process identifiers included in the HARQ process identifier pool, as described above.

As further shown in FIG. 7, in some aspects, process 700 may include receiving an uplink communication associated with the HARQ process identifier (block 730). For example, the UE (such as by using communication manager 150 or reception component 902, depicted in FIG. 9) may receive an uplink communication associated with the HARQ process identifier, as described above.

Process 700 may include additional aspects, such as any single aspect or any combination of aspects described below or in connection with one or more other processes described elsewhere herein.

In a first additional aspect, transmitting the indication of the HARQ process identifier pool comprises transmitting an indication of the HARQ process identifier pool in at least one of an RRC configuration or a DCI configuration.

In a second additional aspect, alone or in combination with the first aspect, process 700 includes transmitting an explicit indication of the plurality of HARQ process identifiers included in the HARQ process identifier pool.

In a third additional aspect, alone or in combination with one or more of the first and second aspects, process 700 includes transmitting an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

In a fourth additional aspect, alone or in combination with one or more of the first through third aspects, process 700 includes receiving an indication of a subset of HARQ process identifiers, of the plurality of HARQ process identifiers included in the HARQ process identifier pool, from which the HARQ process identifier was selected.

In a fifth additional aspect, alone or in combination with one or more of the first through fourth aspects, transmitting the indication of the HARQ process identifier pool comprises transmitting an indication of a plurality of HARQ process identifier pools among which the HARQ process identifier pool is included.

In a sixth additional aspect, alone or in combination with one or more of the first through fifth aspects, process 700 includes cooperating with the UE to configure one or more parameters for assigning HARQ process identifiers to the plurality of HARQ process identifier pools.

In a seventh additional aspect, alone or in combination with one or more of the first through sixth aspects, the one or more parameters comprise at least one of a priority associated with the uplink communication, a QoS class associated with the uplink communication, a $T_{wait}$ parameter associated with the uplink communication, a remaining packet delay budget associated with the uplink communication, or an energy profile associated with the UE.

In an eighth additional aspect, alone or in combination with one or more of the first through seventh aspects, process 700 includes receiving an indication of another HARQ process identifier, associated with another uplink communication, along with the indication of the HARQ process identifier.

In a ninth additional aspect, alone or in combination with one or more of the first through eighth aspects, the indication of the HARQ process identifier and the indication of the other HARQ process identifier are included in a bitmap in an UCI communication.

In a tenth additional aspect, alone or in combination with one or more of the first through ninth aspects, the indication of the HARQ process identifier and the indication of the other HARQ process identifier are included in respective codepoints in an UCI communication.

In an eleventh additional aspect, alone or in combination with one or more of the first through tenth aspects, receiving the indication of the HARQ process identifier comprises receiving the indication of the HARQ process identifier in an UCI communication in one or more first uplink resources; and receiving the uplink communication comprises receiving the uplink communication in one or more second uplink resources that are different from the one or more first uplink resources.

In a twelfth additional aspect, alone or in combination with one or more of the first through eleventh aspects, receiving the indication of the HARQ process identifier comprises receiving the indication of the HARQ process identifier in a subset of uplink resources in which the uplink communication is transmitted.

In a thirteenth additional aspect, alone or in combination with one or more of the first through twelfth aspects, receiving the indication of the HARQ process identifier comprises receiving the indication of the HARQ process identifier in a MAC-CE communication.

In a fourteenth additional aspect, alone or in combination with one or more of the first through thirteenth aspects, receiving the indication of the HARQ process identifier comprises receiving the indication of the HARQ process identifier in an RRC communication.

In a fifteenth additional aspect, alone or in combination with one or more of the first through fourteenth aspects, process 700 includes transmitting an indication of a delay threshold associated with a delay parameter for selection of the HARQ process identifier.

In a sixteenth additional aspect, alone or in combination with one or more of the first through fifteenth aspects, transmitting an indication of the delay threshold comprises transmitting an indication of respective delay thresholds associated with each of a plurality of logical channels of the UE, wherein each of the plurality of logical channels is associated with a particular one of the plurality of HARQ process identifiers included in the HARQ process identifier pool.

In a seventeenth additional aspect, alone or in combination with one or more of the first through sixteenth aspects, process 700 transmitting an indication of a preferred subset of HARQ process identifiers of the plurality of HARQ process identifiers included in the HARQ process identifier pool, wherein the HARQ process identifier is included in the preferred subset of HARQ process identifiers.

In an eighteenth additional aspect, alone or in combination with one or more of the first through seventeenth aspects, receiving the uplink communication comprises receiving an initial transmission of the uplink communication, wherein the HARQ process identifier is associated with the initial transmission of the uplink communication.

In a nineteenth additional aspect, alone or in combination with one or more of the first through eighteenth aspects, receiving the uplink communication comprises receiving a retransmission of the uplink communication, wherein the HARQ process identifier is associated with the retransmission of the uplink communication.

In a twentieth additional aspect, alone or in combination with one or more of the first through nineteenth aspects, process 700 includes configuring the UE with a quantity of HARQ process pools, and configuring a rule for association between the HARQ process pool and a delay parameter.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
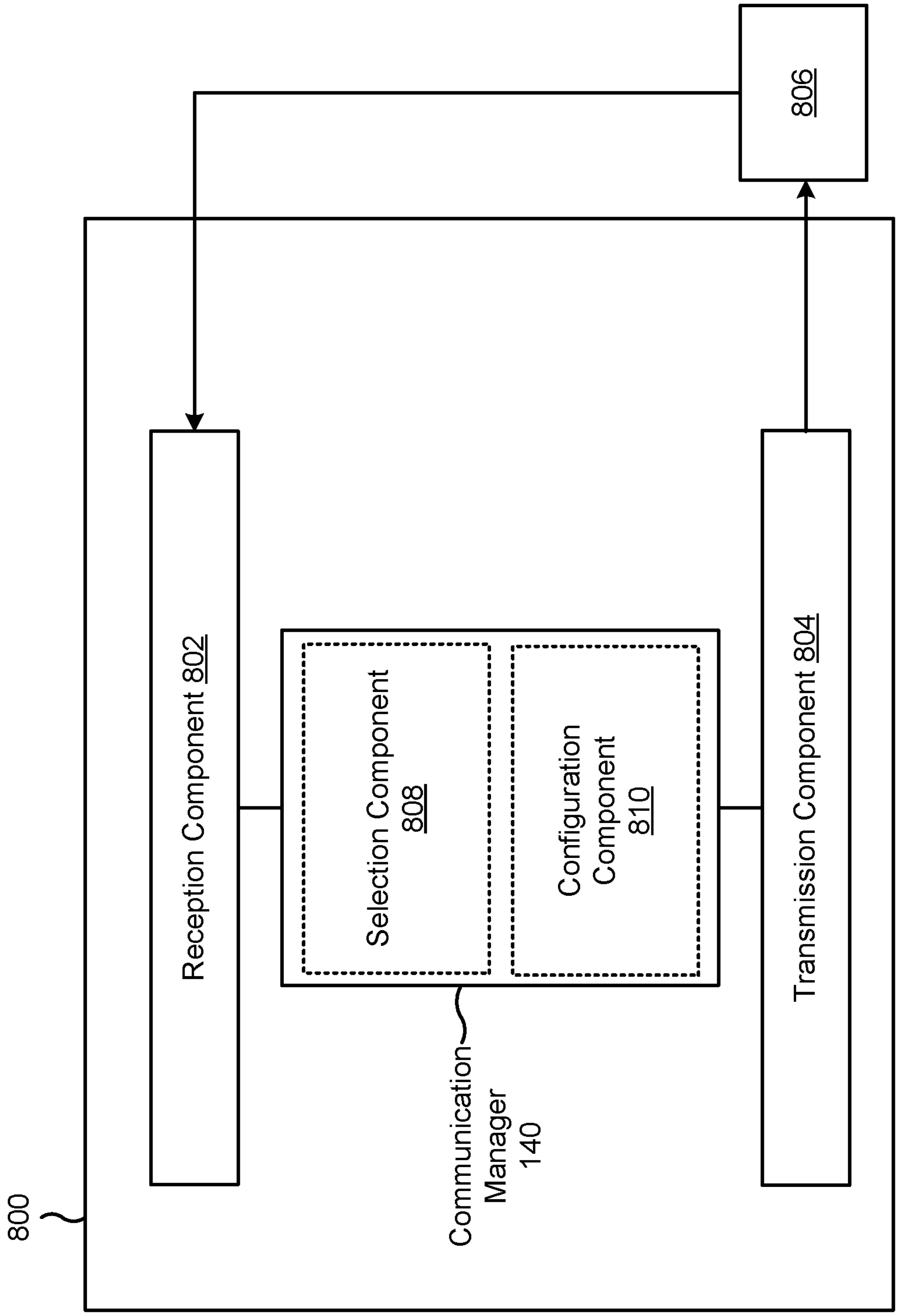
FIG. 8 is a diagram of an example apparatus for wireless communication that supports flexible selection of a HARQ process identifier from a HARQ process identifier pool.

FIG. 8 is a diagram of an example apparatus 800 for wireless communication that supports flexible selection of a HARQ process identifier from a HARQ process identifier pool. The apparatus 800 may be a UE (for example, a UE 120), or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be operable to perform one or more operations described herein in connection with FIGS. 3-5. Additionally or alternatively, the apparatus 800 may be operable to perform one or more processes described herein, such as process 600 of FIG. 6. In some aspects, the apparatus 800 may include one or more components of the UE described above in connection with FIG. 2.

The reception component 802 may receive communications, such as reference signals, control information, and/or data communications, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the UE described above in connection with FIG. 2.

The transmission component 804 may transmit communications, such as reference signals, control information, and/or data communications, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, and/or a memory of the UE described above in connection with FIG. 2. In some aspects, the transmission component 804 may be co-located with the reception component 802 in a transceiver.

The communication manager 140 may select, in association with a delay parameter for an uplink communication, a HARQ process identifier from a plurality of HARQ process identifiers included in a HARQ process identifier pool, the HARQ process identifier being associated with the uplink communication. The communication manager 140 may transmit an indication of the HARQ process identifier. The transmission component 804 may transmit the uplink communication.

The communication manager 140 may receive an indication of the HARQ process identifier pool in at least one of an RRC configuration or a DCI configuration.

The communication manager 140 may receive an explicit indication of the plurality of HARQ process identifiers included in the HARQ process identifier pool.

The communication manager 140 may receive an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

The communication manager 140 may transmit an indication of the subset of HARQ process identifiers.

The communication manager 140 may select the HARQ process identifier pool from a plurality of HARQ process identifier pools.

The communication manager 140 may cooperate with the apparatus 806 to configure one or more parameters for assigning HARQ process identifiers to the plurality of HARQ process identifier pools.

The communication manager 140 may select, in association with another uplink communication, another HARQ process identifier from the plurality of HARQ process identifiers included in the HARQ process identifier pool. The communication manager 140 may transmit an indication of the other HARQ process identifier along with the indication of the HARQ process identifier.

The communication manager 140 may receive an indication of a delay threshold associated with the delay parameter.

The communication manager 140 may receive an indication of a preferred subset of HARQ process identifiers of the plurality of HARQ process identifiers included in the HARQ process identifier pool.

The communication manager 140 may select, from the data packets in the transmission buffer, a subset of data packets for the uplink communication in association with at least one of an expiration time associated with the subset of data packets, a selection order parameter, or a FIFO parameter.

The communication manager 140 may configure a plurality of HARQ process identifier pools associated with a plurality of delay parameters, wherein the HARQ process identifier pools is included in the plurality of HARQ process identifier pools, and wherein the delay parameter is included in the plurality of delay parameters. The communication manager 140 may map logical channels to the plurality of HARQ process identifier pools, and prioritize the HARQ process identifier in association with the plurality of delay parameters.

The communication manager 140 may receive a configuration of a quantity of HARQ process pools, and may receive a configuration of a mapping rule of HARQ processes to HARQ process pools in association with the delay parameter.

The communication manager 140 may include a controller/processor, and/or a memory of the UE described above in connection with FIG. 2. In some aspects, the communication manager 140 includes a set of components, such as a selection component 808 and/or a configuration component 810, among other examples. Alternatively, the set of components may be separate and distinct from the communication manager 140. In some aspects, one or more components of the set of components may include or may be implemented within a controller/processor, and/or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The selection component 808 may select, in association with a delay parameter for an uplink communication, a HARQ process identifier from a plurality of HARQ process identifiers included in a HARQ process identifier pool, the HARQ process identifier being associated with the uplink communication. The transmission component 804 may transmit an indication of the HARQ process identifier. The transmission component 804 may transmit the uplink communication.

The reception component 802 may receive an indication of the HARQ process identifier pool in at least one of an RRC configuration or a DCI configuration.

The reception component 802 may receive an explicit indication of the plurality of HARQ process identifiers included in the HARQ process identifier pool.

The reception component 802 may receive an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

The transmission component 804 may transmit an indication of the subset of HARQ process identifiers.

The selection component 808 may select the HARQ process identifier pool from a plurality of HARQ process identifier pools.

The configuration component 810 may cooperate with the apparatus 806 to jointly configure one or more parameters for assigning HARQ process identifiers to the plurality of HARQ process identifier pools.

The selection component 808 may select, in association with another uplink communication, another HARQ process identifier from the plurality of HARQ process identifiers included in the HARQ process identifier pool. The transmission component 804 may transmit an indication of the other HARQ process identifier along with the indication of the HARQ process identifier.

The reception component 802 may receive an indication of a delay threshold associated with the delay parameter.

The reception component 802 may receive an indication of a preferred subset of HARQ process identifiers of the plurality of HARQ process identifiers included in the HARQ process identifier pool.

The selection component 808 may select, from the data packets in the transmission buffer, a subset of data packets for the uplink communication in association with at least one of an expiration time associated with the subset of data packets, a selection order parameter, or a FIFO parameter.

The configuration component 810 may configure a plurality of HARQ process identifier pools associated with a plurality of delay parameters, wherein the HARQ process identifier pools is included in the plurality of HARQ process identifier pools, and wherein the delay parameter is included in the plurality of delay parameters. The selection component 808 may map logical channels to the plurality of HARQ process identifier pools, and prioritize the HARQ process identifier in association with the plurality of delay parameters.

The reception component 802 may receive a configuration of a quantity of HARQ process pools, and may receive a configuration of a mapping rule of HARQ processes to HARQ process pools in association with the delay parameter.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
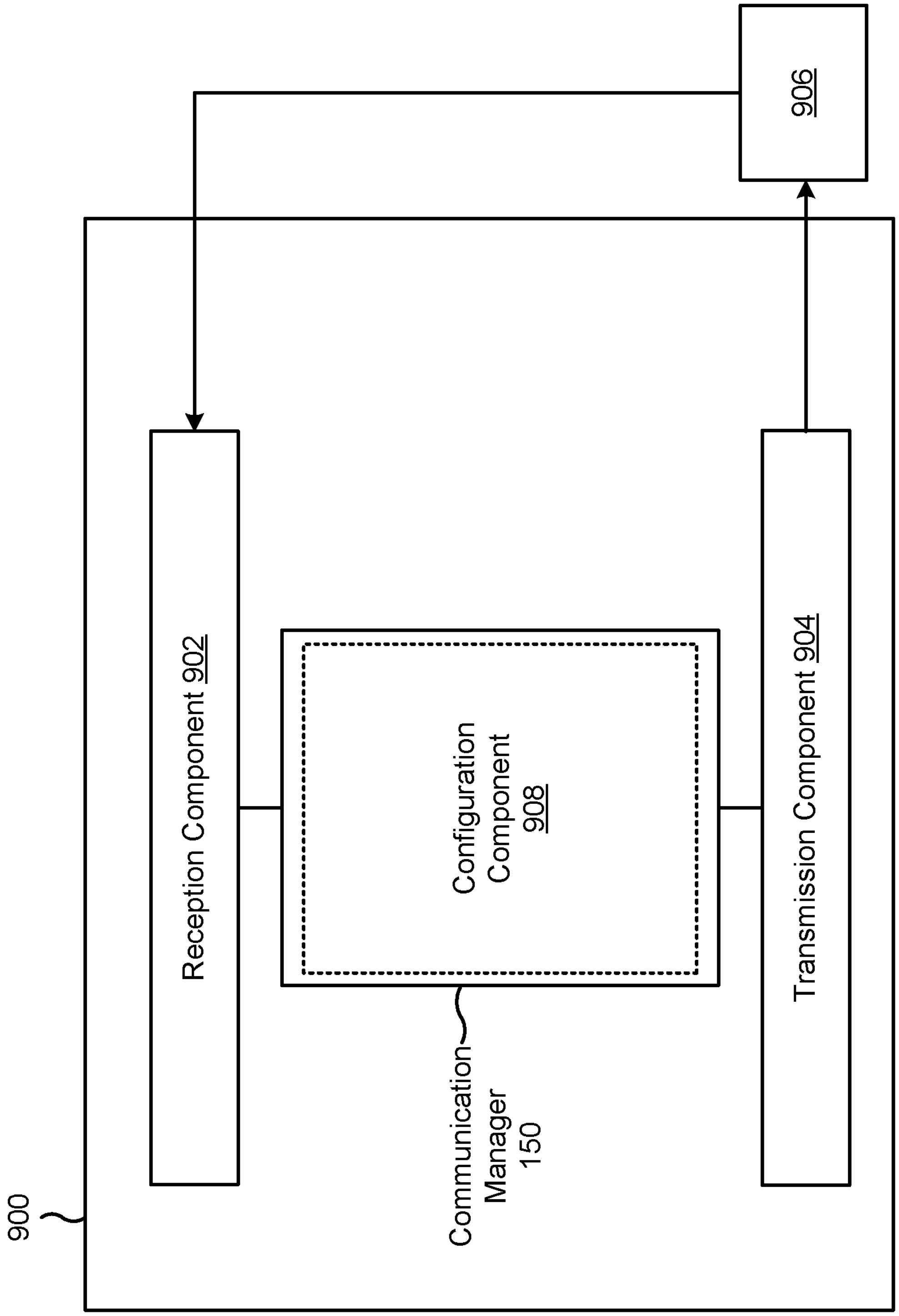
FIG. 9 is a diagram of an example apparatus for wireless communication that supports flexible selection of a HARQ process identifier from a HARQ process identifier pool.

FIG. 9 is a diagram of an example apparatus 900 for wireless communication that supports flexible selection of a HARQ process identifier from a HARQ process identifier pool. The apparatus 900 may be a network node (for example, a network node 110), or a network node may include the apparatus 900. In some aspects, the apparatus 800 includes a reception component 902, a transmission component 904, and a communication manager 150, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be operable to perform one or more operations described herein in connection with FIGS. 3-5. Additionally or alternatively, the apparatus 900 may be operable to perform one or more processes described herein, such as process 700 of FIG. 9. In some aspects, the apparatus 900 may include one or more components of the network node described above in connection with FIG. 2.

The reception component 902 may receive communications, such as reference signals, control information, and/or data communications, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the network node described above in connection with FIG. 2.

The transmission component 904 may transmit communications, such as reference signals, control information, and/or data communications, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the network node described above in connection with FIG. 2. In some aspects, the transmission component 904 may be co-located with the reception component 902 in a transceiver.

The communication manager 150 may transmit an indication of a HARQ process identifier pool associated with the apparatus 906. The communication manager 150 may receive an indication of a HARQ process identifier among a plurality of HARQ process identifiers included in the HARQ process identifier pool. The communication manager 150 receive an uplink communication associated with the HARQ process identifier.

The communication manager 150 may transmit an explicit indication of the plurality of HARQ process identifiers included in the HARQ process identifier pool.

The communication manager 150 may transmit an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

The communication manager 150 may receive an indication of a subset of HARQ process identifiers, of the plurality of HARQ process identifiers included in the HARQ process identifier pool, from which the HARQ process identifier was selected.

The communication manager 150 may cooperate with the apparatus 906 to configure one or more parameters for assigning HARQ process identifiers to the plurality of HARQ process identifier pools.

The communication manager 150 may receive an indication of another HARQ process identifier, associated with another uplink communication, along with the indication of the HARQ process identifier.

The communication manager 150 may transmit an indication of a delay threshold associated with a delay parameter for selection of the HARQ process identifier.

The communication manager 150 may transmit an indication of a preferred subset of HARQ process identifiers of the plurality of HARQ process identifiers included in the HARQ process identifier pool, wherein the HARQ process identifier is included in the preferred subset of HARQ process identifiers.

The communication manager 150 may configure the UE with a quantity of HARQ process pools, and may configure a rule for association between the HARQ process pool and a delay parameter.

The communication manager 150 may include a controller/processor, and/or a memory of the network node described above in connection with FIG. 2. In some aspects, the communication manager 150 includes a set of components, such as a configuration component 908, among other examples. Alternatively, the set of components may be separate and distinct from the communication manager 150. In some aspects, one or more components of the set of components may include or may be implemented within a controller/processor, and/or a memory of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit an indication of a HARQ process identifier pool associated with the apparatus 906. The reception component 902 may receive an indication of a HARQ process identifier among a plurality of HARQ process identifiers included in the HARQ process identifier pool. The reception component 902 receive an uplink communication associated with the HARQ process identifier.

The transmission component 904 may transmit an explicit indication of the plurality of HARQ process identifiers included in the HARQ process identifier pool.

The transmission component 904 may transmit an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

The reception component 902 may receive an indication of a subset of HARQ process identifiers, of the plurality of HARQ process identifiers included in the HARQ process identifier pool, from which the HARQ process identifier was selected.

The configuration component 908 may cooperate with the apparatus 906 to configure one or more parameters for assigning HARQ process identifiers to the plurality of HARQ process identifier pools.

The reception component 902 may receive an indication of another HARQ process identifier, associated with another uplink communication, along with the indication of the HARQ process identifier.

The transmission component 904 may transmit an indication of a delay threshold associated with a delay parameter for selection of the HARQ process identifier.

The transmission component 904 may transmit an indication of a preferred subset of HARQ process identifiers of the plurality of HARQ process identifiers included in the HARQ process identifier pool, wherein the HARQ process identifier is included in the preferred subset of HARQ process identifiers.

The configuration component 908 may configure the UE with a quantity of HARQ process pools, and may configure a rule for association between the HARQ process pool and a delay parameter.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed at a user equipment (UE), comprising: selecting, in association with a delay parameter for an uplink communication, a hybrid automatic repeat request (HARQ) process identifier from a plurality of HARQ process identifiers included in a HARQ process identifier pool, the HARQ process identifier being associated with the uplink communication; transmitting an indication of the HARQ process identifier; and transmitting the uplink communication.

Aspect 2: The method of Aspect 1, wherein the delay parameter comprises at least one of: a priority associated with the uplink communication, a quality of service (QoS) class associated with the uplink communication, a $T_{wait}$ parameter associated with the uplink communication, or a remaining packet delay budget associated with the uplink communication.

Aspect 3: The method of any of Aspects 1 or 2, further comprising: receiving an indication of the HARQ process identifier pool in at least one of: a radio resource control (RRC) configuration, or a dynamic control information (DCI) configuration.

Aspect 4: The method of any of Aspects 1-3, further comprising: receiving an explicit indication of the plurality of HARQ process identifiers included in the HARQ process identifier pool.

Aspect 5: The method of any of Aspects 1-4, further comprising: receiving an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

Aspect 6: The method of any of Aspects 1-5, wherein selecting the HARQ process identifier comprises: selecting, in association with an energy profile associated with the UE, a subset of HARQ process identifiers from the plurality of HARQ process identifiers included in the HARQ process identifier pool; and selecting the HARQ process identifier from the subset of HARQ process identifiers.

Aspect 7: The method of Aspect 6, wherein the energy profile comprises at least one of: a charging rate profile associated with the UE, a discharging rate profile associated with the UE, or an energy level profile associated with the UE.

Aspect 8: The method of any of Aspects 6-7, further comprising: transmitting an indication of the subset of HARQ process identifiers.

Aspect 9: The method of any of Aspects 1-8, wherein the HARQ process identifier pool is one of a plurality of HARQ process identifier pools associated with the UE; and wherein the method further comprises: selecting the HARQ process identifier pool from the plurality of HARQ process identifier pools.

Aspect 10: The method of Aspect 9, further comprising: cooperating with a network node to configure one or more parameters for assigning HARQ process identifiers to the plurality of HARQ process identifier pools.

Aspect 11: The method of Aspect 10, further comprising: receiving, from the network node, an input for facilitating selection of the HARQ process identifier.

Aspect 12: The method of Aspect 10 or 11, wherein the one or more parameters comprise at least one of: a priority associated with the uplink communication, a quality of service (QOS) class associated with the uplink communication, a $T_{wait}$ parameter associated with the uplink communication, a remaining packet delay budget associated with the uplink communication, or an energy profile associated with the UE.

Aspect 13: The method of any of Aspects 1-12, further comprising: selecting, in association with another uplink communication, another HARQ process identifier from the plurality of HARQ process identifiers included in the HARQ process identifier pool; and transmitting an indication of the other HARQ process identifier along with the indication of the HARQ process identifier.

Aspect 14: The method of Aspect 13, wherein the indication of the HARQ process identifier and the indication of the other HARQ process identifier are included in a bitmap in an uplink control information (UCI) communication.

Aspect 15: The method of any of Aspects 13 or 14, wherein the indication of the HARQ process identifier and the indication of the other HARQ process identifier are included in respective codepoints in an uplink control information (UCI) communication.

Aspect 16: The method of any of Aspects 1-15, wherein transmitting the indication of the HARQ process identifier comprises: transmitting the indication of the HARQ process identifier in an uplink control information (UCI) communication in one or more first uplink resources; and wherein transmitting the uplink communication comprises: transmitting the uplink communication in one or more second uplink resources that are different from the one or more first uplink resources.

Aspect 17: The method of any of Aspects 1-16, wherein transmitting the indication of the HARQ process identifier comprises: transmitting the indication of the HARQ process identifier in a subset of uplink resources in which the uplink communication is transmitted.

Aspect 18: The method of any of Aspects 1-17, wherein transmitting the indication of the HARQ process identifier comprises: transmitting the indication of the HARQ process identifier in a medium access control (MAC) control element (MAC-CE) communication.

Aspect 19: The method of any of Aspects 1-18, wherein transmitting the indication of the HARQ process identifier comprises: transmitting the indication of the HARQ process identifier in a radio resource control (RRC) communication.

Aspect 20: The method of any of Aspects 1-19, further comprising: receiving an indication of a delay threshold associated with the delay parameter; and wherein selecting the HARQ process identifier comprises: selecting the HARQ process identifier in association with whether the delay parameter satisfies the delay threshold.

Aspect 21: The method of Aspect 20, wherein receiving the indication of the delay threshold comprises: receiving an indication of respective delay thresholds associated with each of a plurality of logical channels of the UE, wherein each of the plurality of logical channels is associated with a particular one of the plurality of HARQ process identifiers included in the HARQ process identifier pool.

Aspect 22: The method of any of Aspects 1-21, further comprising: receiving an indication of a preferred subset of HARQ process identifiers of the plurality of HARQ process identifiers included in the HARQ process identifier pool, wherein selecting the HARQ process identifier comprises: selecting the HARQ process identifier from the preferred subset of HARQ process identifiers.

Aspect 23: The method of any of Aspects 1-22, wherein transmitting the uplink communication comprises: transmitting an initial transmission of the uplink communication, wherein the HARQ process identifier is associated with the initial transmission of the uplink communication.

Aspect 24: The method of any of Aspects 1-23, wherein transmitting the uplink communication comprises: transmitting a retransmission of the uplink communication, wherein the HARQ process identifier is associated with the retransmission of the uplink communication.

Aspect 25: The method of any of Aspects 1-24, wherein all data packets in a transmission buffer of the UE are expired; and wherein the method further comprises: selecting, from the data packets in the transmission buffer, a subset of data packets for the uplink communication in association with at least one of: an expiration time associated with the subset of data packets, a selection order parameter, or a first-in-first-out (FIFO) parameter.

Aspect 26: The method of any of Aspects 1-25, further comprising: configuring a plurality of HARQ process identifier pools associated with a plurality of delay parameters, wherein the HARQ process identifier pools is included in the plurality of HARQ process identifier pools, and wherein the delay parameter is included in the plurality of delay parameters; and mapping logical channels to the plurality of HARQ process identifier pools, wherein selecting the HARQ process identifier comprises: prioritizing the HARQ process identifier in association with the plurality of delay parameters.

Aspect 27: The method of any of Aspects 1-26, further comprising: receiving a configuration of a quantity of HARQ process pools; and receiving a configuration of a mapping rule of HARQ processes to HARQ process pools in association with the delay parameter.

Aspect 28: A method of wireless communication performed at a network node, comprising: transmitting an indication of a hybrid automatic repeat request (HARQ) process identifier pool associated with a user equipment (UE); receiving an indication of a HARQ process identifier among a plurality of HARQ process identifiers included in the HARQ process identifier pool; and receiving an uplink communication associated with the HARQ process identifier.

Aspect 29: The method of Aspect 28, wherein transmitting the indication of the HARQ process identifier pool comprises: transmitting an indication of the HARQ process identifier pool in at least one of: a radio resource control (RRC) configuration, or a dynamic control information (DCI) configuration.

Aspect 30: The method of any of Aspects 28-29, further comprising: transmitting an explicit indication of the plurality of HARQ process identifiers included in the HARQ process identifier pool.

Aspect 31: The method of any of Aspects 28-30, further comprising: transmitting an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

Aspect 32: The method of any of Aspects 28-31, further comprising: receiving an indication of a subset of HARQ process identifiers, of the plurality of HARQ process identifiers included in the HARQ process identifier pool, from which the HARQ process identifier was selected.

Aspect 33: The method of any of Aspects 28-32, wherein transmitting the indication of the HARQ process identifier pool comprises: transmitting an indication of a plurality of HARQ process identifier pools among which the HARQ process identifier pool is included.

Aspect 34: The method of Aspect 33, further comprising: cooperating with the UE to configure one or more parameters for assigning HARQ process identifiers to the plurality of HARQ process identifier pools.

Aspect 35: The method of Aspect 34, wherein the one or more parameters comprise at least one of: a priority associated with the uplink communication, a quality of service (QOS) class associated with the uplink communication, a $T_{wait}$ parameter associated with the uplink communication, a remaining packet delay budget associated with the uplink communication, or an energy profile associated with the UE.

Aspect 36: The method of any of Aspects 28-35, further comprising: receiving an indication of another HARQ process identifier, associated with another uplink communication, along with the indication of the HARQ process identifier.

Aspect 37: The method of Aspect 36, wherein the indication of the HARQ process identifier and the indication of the other HARQ process identifier are included in a bitmap in an uplink control information (UCI) communication.

Aspect 38: The method of any of Aspects 36-37, wherein the indication of the HARQ process identifier and the indication of the other HARQ process identifier are included in respective codepoints in an uplink control information (UCI) communication.

Aspect 39: The method of any of Aspects 28-38, wherein receiving the indication of the HARQ process identifier comprises: receiving the indication of the HARQ process identifier in an uplink control information (UCI) communication in one or more first uplink resources; and wherein receiving the uplink communication comprises: receiving the uplink communication in one or more second uplink resources that are different from the one or more first uplink resources.

Aspect 40: The method of any of Aspects 28-39, wherein receiving the indication of the HARQ process identifier comprises: receiving the indication of the HARQ process identifier in a subset of uplink resources in which the uplink communication is transmitted.

Aspect 41: The method of any of Aspects 28-40, wherein receiving the indication of the HARQ process identifier comprises: receiving the indication of the HARQ process identifier in a medium access control (MAC) control element (MAC-CE) communication.

Aspect 42: The method of any of Aspects 28-41, wherein receiving the indication of the HARQ process identifier comprises: receiving the indication of the HARQ process identifier in a radio resource control (RRC) communication.

Aspect 43: The method of any of Aspects 28-42, further comprising: transmitting an indication of a delay threshold associated with a delay parameter for selection of the HARQ process identifier.

Aspect 44: The method of Aspect 43, wherein transmitting an indication of the delay threshold comprises: transmitting an indication of respective delay thresholds associated with each of a plurality of logical channels of the UE, wherein each of the plurality of logical channels is associated with a particular one of the plurality of HARQ process identifiers included in the HARQ process identifier pool.

Aspect 45: The method of any of Aspects 28-44, further comprising: transmitting an indication of a preferred subset of HARQ process identifiers of the plurality of HARQ process identifiers included in the HARQ process identifier pool, wherein the HARQ process identifier is included in the preferred subset of HARQ process identifiers.

Aspect 46: The method of any of Aspects 28-45, wherein receiving the uplink communication comprises: receiving an initial transmission of the uplink communication, wherein the HARQ process identifier is associated with the initial transmission of the uplink communication.

Aspect 47: The method of any of Aspects 28-46, wherein receiving the uplink communication comprises: receiving a retransmission of the uplink communication, wherein the HARQ process identifier is associated with the retransmission of the uplink communication.

Aspect 48: The method of any of aspects 28-47, further comprising: configuring the UE with a quantity of HARQ process pools, and configuring a rule for association between the HARQ process pool and a delay parameter.

Aspect 49: An apparatus for wireless communication at a device, comprising a processor; memory coupled with the processor; and instructions stored in the memory and executable by the processor to cause the apparatus to perform the method of one or more of Aspects 1-48.

Aspect 50: A device for wireless communication, comprising a memory and one or more processors coupled to the memory, the one or more processors configured to perform the method of one or more of Aspects 1-48.

Aspect 51: An apparatus for wireless communication, comprising at least one means for performing the method of one or more of Aspects 1-48.

Aspect 52: A non-transitory computer-readable medium storing code for wireless communication, the code comprising instructions executable by a processor to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), identifying, inferring, ascertaining, measuring, and the like. Also, "determining" can include receiving (such as receiving information or receiving an indication), accessing (such as accessing data stored in memory), transmitting (such as transmitting information) and the like. Also, "determining" can include resolving, selecting, obtaining, choosing, establishing and other such similar actions.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:
- one or more memories storing processor-readable code; and
- one or more processors coupled with the one or more memories, at least one processor of the one or more processors operable to cause the UE to:
  - select, in association with a delay parameter for an uplink communication, a hybrid automatic repeat request (HARQ) process identifier from a plurality of HARQ process identifiers included in a HARQ process identifier pool, the HARQ process identifier being associated with the uplink communication;
  - transmit an indication of the HARQ process identifier; and
  - transmit the uplink communication;
- wherein all data packets in a transmission buffer of the UE are expired; and
  - wherein at least one of the one or more processors is operable to cause the UE to:
    - select, from the data packets in the transmission buffer, a subset of data packets for the uplink communication in association with at least one of:
      - an expiration time associated with the subset of data packets,
      - a selection order parameter, or
      - a first-in-first-out (FIFO) parameter.

2. The apparatus of claim 1, wherein at least one processor of the one or more processors is operable to cause the UE to:
- receive an indication of the HARQ process identifier pool in at least one of:
  - a radio resource control (RRC) configuration, or
  - a dynamic control information (DCI) configuration.

3. The apparatus of claim 1, wherein at least one processor of the one or more processors is operable to cause the UE to:
- receive an explicit indication of a first HARQ process identifier of the plurality of HARQ process identifiers included in the HARQ process identifier pool, and an indication of a quantity of HARQ process identifiers in the HARQ process identifier pool starting from the first HARQ process identifier.

4. The apparatus of claim 1, wherein the HARQ process identifier pool is one of a plurality of HARQ process identifier pools associated with the UE; and
- wherein at least one processor of the one or more processors is operable to cause the UE to:

select the HARQ process identifier pool from the plurality of HARQ process identifier pools.

5. The apparatus of claim 4, wherein at least one processor of the one or more processors is operable to cause the UE to:

cooperate with a network node to configure one or more parameters for assigning HARQ process identifiers to the plurality of HARQ process identifier pools.

6. The apparatus of claim 5, wherein at least one processor of the one or more processors is operable to cause the UE to:

receive, from the network node, an input for facilitating selection of the HARQ process identifier.

7. The apparatus of claim 5, wherein the one or more parameters comprise at least one of:

a priority associated with the uplink communication, a quality of service (QoS) class associated with the uplink communication, a $T_{wait}$ parameter associated with the uplink communication, a remaining packet delay budget associated with the uplink communication, or an energy profile associated with the UE.

8. The apparatus of claim 1, wherein at least one processor of the one or more processors is operable to cause the UE to:

select, in association with another uplink communication, another HARQ process identifier from the plurality of HARQ process identifiers included in the HARQ process identifier pool; and transmit an indication of the other HARQ process identifier along with the indication of the HARQ process identifier.

9. The apparatus of claim 8, wherein the indication of the HARQ process identifier and the indication of the other HARQ process identifier are included in a bitmap in an uplink control information (UCI) communication.

10. The apparatus of claim 8, wherein the indication of the HARQ process identifier and the indication of the other HARQ process identifier are included in respective codepoints in an uplink control information (UCI) communication.

11. The apparatus of claim 1, wherein at least processor one of the one or more processors, to cause the UE to transmit the indication of the HARQ process identifier, is operable to cause the UE to at least one of:

transmit the indication of the HARQ process identifier in a subset of uplink resources in which the uplink communication is transmitted, or transmit the indication of the HARQ process identifier in a radio resource control (RRC) communication.

12. The apparatus of claim 1, wherein at least one processor of the one or more processors is operable to cause the UE to:

receive an indication of a preferred subset of HARQ process identifiers of the plurality of HARQ process identifiers included in the HARQ process identifier pool, wherein at least one of the one or more processors, to cause the UE to select the HARQ process identifier, is operable to cause the UE to:

select the HARQ process identifier from the preferred subset of HARQ process identifiers.

13. The apparatus of claim 1, wherein at least one processor of the one or more processors, to cause the UE to transmit the uplink communication, is operable to cause the UE to:

transmit an initial transmission of the uplink communication, wherein the HARQ process identifier is associated with the initial transmission of the uplink communication.

14. The apparatus of claim 1, wherein at least one processor of the one or more processors, to cause the UE to transmit the uplink communication, is operable to cause the UE to:

transmit a retransmission of the uplink communication, wherein the HARQ process identifier is associated with the retransmission of the uplink communication.

15. A method of wireless communication performed at a user equipment (UE), comprising:

selecting, in association with a delay parameter for an uplink communication, a hybrid automatic repeat request (HARQ) process identifier from a plurality of HARQ process identifiers included in a HARQ process identifier pool, the HARQ process identifier being associated with the uplink communication;

transmitting an indication of the HARQ process identifier; and transmitting the uplink communication;

wherein selecting the HARQ process identifier comprises:

selecting, in association with an energy profile associated with the UE, a subset of HARQ process identifiers from the plurality of HARQ process identifiers included in the HARQ process identifier pool; and selecting the HARQ process identifier from the subset of HARQ process identifiers.

16. The method of claim 15, wherein the delay parameter comprises at least one of:

a priority associated with the uplink communication, a quality of service (QoS) class associated with the uplink communication, a $T_{wait}$ parameter associated with the uplink communication, or a remaining packet delay budget associated with the uplink communication.

17. The method of claim 15, further comprising:

receiving an explicit indication of the plurality of HARQ process identifiers included in the HARQ process identifier pool.

18. The method of claim 15, further comprising:

receiving a configuration of a quantity of HARQ process pools; and receiving a configuration of a mapping rule of HARQ processes to HARQ process pools in association with the delay parameter.

* * * * *